US012789213B2

(12) United States Patent
Tawata et al.

(10) Patent No.: US 12,789,213 B2
(45) Date of Patent: Nov. 10, 2026

(54) COATING MATERIAL SUPPLY ASSEMBLY FOR PAINTING ROBOTS

(71) Applicant: ABB Schweiz AG, Baden (CH)

(72) Inventors: Takahiro Tawata, Tokyo (JP); Norio Umezawa, Tokyo (JP)

(73) Assignee: ABB Schweiz AG, Baden (CH)

( * ) Notice: Subject to any disclaimer, the term of this patent is extended or adjusted under 35 U.S.C. 154(b) by 1017 days.

(21) Appl. No.: 17/937,078

(22) Filed: Sep. 30, 2022

(65) Prior Publication Data

US 2023/0134252 A1 May 4, 2023

(30) Foreign Application Priority Data

Nov. 4, 2021 (JP) ................................ 2021-180379

(51) Int. Cl.

*B05B 13/00* (2006.01)
*B05B 9/04* (2006.01)
*B05B 12/08* (2006.01)
*B05B 13/04* (2006.01)
*B05B 14/00* (2018.01)

(Continued)

(52) U.S. Cl.

CPC ............ *B05B 14/00* (2018.02); *B05B 9/0403* (2013.01); *B05B 12/085* (2013.01); *B05B 13/002* (2025.08); *B05B 15/40* (2018.02); *B05B 15/58* (2018.02); *B25J 11/0075* (2013.01);

(Continued)

(58) Field of Classification Search

None

See application file for complete search history.

(56) References Cited

U.S. PATENT DOCUMENTS 6,082,851 A * 7/2000 Shihoh .................... B41J 2/175 347/85
7,118,206 B1 * 10/2006 Stockwell ................. B41J 2/19 347/85

(Continued)

FOREIGN PATENT DOCUMENTS

CN 102941172 A 2/2013
CN 104941868 A 9/2015

(Continued)

OTHER PUBLICATIONS

Japan Notice of Reasons for Refusal, issued by the Japanese Patent Office, regarding corresponding patent application Serial No. JP 2012-180379; dated Dec. 8, 2021; 4 pages (with English translation).

(Continued)

*Primary Examiner* — Binu Thomas

(74) *Attorney, Agent, or Firm* — Whitmyer IP Group LLC

(57) ABSTRACT

A painting robot includes a painting head mounted on the tip end side of a robot arm, a coating material supply passage connected to the coating material supply side of the painting head, a return flow passage which recovers coating material that was not ejected from the nozzles, and a bypass flow passage that is provided in the robot arm and allows coating material to flow through in parallel to the painting head. The painting robot further includes a shutoff valve, a control unit which controls the opening and closing of the shutoff valve, and a first air bubble removal member and second air bubble removal member which are provided in a stable part of the robot arm.

16 Claims, 10 Drawing Sheets

(51) Int. Cl.

| | |
|---|---|
| ***B05B 15/40*** | (2018.01) |
| ***B05B 15/58*** | (2018.01) |
| ***B25J 11/00*** | (2006.01) |
| ***B41J 2/19*** | (2006.01) |

(52) U.S. Cl.

CPC ............. *B41J 2/19* (2013.01); *B05B 13/0431* (2013.01); *B41J 2202/12* (2013.01)

(56) References Cited

U.S. PATENT DOCUMENTS

| | | | | |
|---|---|---|---|---|
| 2015/0224786 | A1* | 8/2015 | Otsuka | B41J 2/19 347/92 |
| 2017/0136481 | A1 | 5/2017 | Fritz et al. | |
| 2019/0009559 | A1* | 1/2019 | McAuliffe | B41J 2/19 |
| 2020/0180322 | A1* | 6/2020 | Lee | B41J 2/19 |
| 2020/0406617 | A1* | 12/2020 | Tawata | B05B 13/0431 |
| 2022/0168769 | A1* | 6/2022 | Rodrigues | B05B 13/0431 |

FOREIGN PATENT DOCUMENTS

| | | | | |
|---|---|---|---|---|
| JP | 2002079067 | A | 3/2002 | |
| JP | 2003-010604 | A | 1/2003 | |
| JP | 2008264767 | A | 11/2008 | |
| JP | 2012-228643 | A | 11/2012 | |
| JP | 2013-530816 | A | 8/2013 | |
| JP | 2020-501883 | A | 1/2020 | |
| JP | 6948482 | B1 | 10/2021 | |
| KR | 20200070676 | A | 6/2020 | |
| WO | 2020261443 | A1 | 12/2020 | |
| WO | WO-2021028983 | A1 * | 2/2021 | B05B 13/0433 |

OTHER PUBLICATIONS

Japan Notice of Allowance, issued by the Japanese Patent Office, regarding corresponding patent application Serial No. JP 2021-180379; dated Apr. 19, 2022; 6 pages (with English translation).

Extended European Search Report, App. No. 22199211.8, dated Mar. 28, 2023, 8 pages, European Patent Office,.

* cited by examiner

COATING MATERIAL SUPPLY ASSEMBLY FOR PAINTING ROBOTS

CROSS-REFERENCE TO RELATED APPLICATIONS

This application claims priority to Japanese patent application Serial No.: 2021-180379, filed on Nov. 4, 2021; which is herein incorporated by reference in its entirety.

TECHNICAL FIELD

The present invention relates to a painting robot.

BACKGROUND ART

The mainstream practice on painting lines for automobiles and other vehicles is robot painting using a robot. Such robot painting uses a painting machine having a rotary atomization type painting head (rotary atomization type painting machine) mounted on the tip end of a multi-jointed robot. Furthermore, as disclosed for example in patent document 1, a configuration has been disclosed in which a coating agent return device (11) is provided for circulating coating agent that is not needed at the printhead (10).

PRIOR ART DOCUMENTS

Patent Documents

[Patent document 1] Japanese Kohyo Patent Application Publication 2020-501883

SUMMARY

Problem to be Solved by the Invention

When painting is performed by mounting an ink jet type printhead on the tip end of a robot arm, since the individual coating material ejection nozzles provided in the printhead do not have a sealing mechanism such as a valve element, air (air bubbles) may be drawn in depending on the orientation of the printhead and the pressure difference between the primary side and secondary side. Furthermore, when performing a coating material color change or when filling coating material into the painting head, air (air bubbles) may be drawn in through the nozzles. When such drawing-in of air occurs, the problem arises that air (air bubbles) which is difficult to evacuate becomes accumulated inside the nozzle, and it becomes difficult to push out the coating material through driving of a piezoelectric element. However, it is difficult to solve this sort of problem on the basis of patent document 1.

The present invention was made in light of the situation described above, and seeks to provide a painting robot that enables effective deaeration when painting is performed using a painting head mounted on the tip end side of the robot arm.

Means for Solving the Problem

To solve the aforesaid problem, according to a first aspect of the present invention, there is provided a painting robot equipped with a robot arm, which performs painting on an object of painting through actuation of the robot arm, the painting robot being characterized in that it comprises: a painting head which is mounted on the tip end side of the robot arm and which comprises multiple nozzles that eject coating material and causes the coating material to be ejected from the nozzles through driving of a piezoelectric substrate; a coating material supply passage which is connected to the coating material supply side of the painting head; a return flow passage which is connected to the coating material evacuation side of the painting head and which recovers the coating material that was not ejected from the nozzles; a bypass flow passage which is provided in the robot arm and which allows the coating material to flow through in parallel to the painting head; a shutoff valve which is provided in the bypass flow passage and which switches on or off the flow of the coating material flowing through the bypass flow passage; a valve control means which controls the opening and closing of the shutoff valve; and an air bubble removal means which is provided in a stable part of the robot arm whereof the orientation does not change and which is provided so as to enable supply of the coating material to the coating material supply passage or the return flow passage and removes air bubbles contained in the coating material.

Furthermore, in the aforesaid invention, preferably, the air bubble removal means comprises a tank main body which stores the coating material; an evacuation port for evacuating gas from within the tank main body is provided in the tank main body above the coating material storage area; and an outflow port which allows the coating material to flow to the downstream side is provided in the lower portion of the coating material storage area of the tank main body.

Furthermore, in the aforesaid invention, preferably, the evacuation port is provided with an openable and closeable air evacuation valve; and the air evacuation valve is a control valve which is opened under the control of the valve control means when a fixed period of time has elapsed or when the pressure of gas inside the tank main body has reached a fixed magnitude.

Furthermore, in the aforesaid invention, preferably, the evacuation port is provided with an openable and closeable air evacuation valve; and the air evacuation valve is a relief valve which opens automatically when the internal pressure due to inflow of the air bubbles into the tank main body rises to a predetermined pressure.

Furthermore, in the aforesaid invention, preferably, the coating material is supplied inside the tank main body via a coating material introduction pipe line; the coating material inside the tank main body is evacuated from inside the tank main body via a coating material evacuation pipe line; a partition filter that removes the air bubbles when the coating material passes therethrough is installed inside the tank main body; and the partition filter demarcates the inside of the tank main body into the coating material introduction pipe line side and the coating material evacuation pipe line side, such that the coating material on the coating material introduction pipe line side inside the tank main body will flow to the coating material evacuation pipe line side by passing through the partition filter.

Furthermore, in the aforesaid invention, preferably, a stirrer is mounted to the tank main body; the stirrer comprises a stirring element and a stirring element driving device; the stirring element driving device comprises a drive magnet which generates magnetic attraction force between the stirring element driving device and the stirring element, and a motor which causes the drive magnet to rotate; the stirring element is arranged inside the tank main body; the drive magnet is arranged outside the tank main body in a state opposite the stirring element; and rotating the drive magnet through driving of the motor causes the stirring element to rotate, causing the coating material inside the tank main body to rotate in conjunction with rotation of the stirring element.

Furthermore, in the aforesaid invention, preferably, a gear pump which evacuates the coating material to the downstream side is provided at any location within a coating material circulation passage constituted by the coating material supply passage, the return flow passage and the bypass flow passage; a pump control means is provided for controlling rotational speed of the gear pump; on at least one of the upstream side or the downstream side of the coating material circulation passage from the gear pump, there is provided a pressure sensor for measuring pressure of the coating material flowing through the coating material circulation passage; there is provided a determination means which determines that there is admixture of air bubbles in cases where air bubbles have entered the coating material, on the basis of a controlled rotational speed at which the gear pump is driven in accordance with control by the pump control means, and on the basis of a measured pressure that has been measured by the pressure sensor, and which determines that there is air admixture in cases where the measured pressure is above a predetermined upper limit value or is below a predetermined lower limit value relative to a set pressure value corresponding to the controlled rotational speed; and a notification means is provided for notifying that there is air admixture when it has been determined by the determination means that there is air admixture.

Furthermore, in the aforesaid invention, preferably, a gear pump which evacuates the coating material to the downstream side is provided at any location within a coating material circulation passage constituted by the coating material supply passage, the return flow passage and the bypass flow passage; a pump control means is provided for controlling rotational speed of the gear pump; on at least one of the upstream side or the downstream side of the coating material circulation passage from the gear pump, there is provided a flowmeter for measuring flow rate of the coating material flowing through the coating material circulation passage; there is provided a determination means which determines that there is admixture of air bubbles in cases where air bubbles have entered the coating material, on the basis of a controlled rotational speed at which the gear pump is driven in accordance with control by the pump control means, and on the basis of a measured flow rate of coating material that has been measured by the flowmeter, and which determines that there is air admixture in cases where the measured flow rate is above a predetermined upper limit value or is below a predetermined lower limit value relative to a set flow rate value corresponding to the controlled rotational speed; and a notification means is provided for notifying that there is air admixture when it has been determined by the determination means that there is air admixture.

Furthermore, in the aforesaid invention, preferably, in cases where it has been determined by the determination means that there is air admixture, the valve control means causes the shutoff valve to open such that the coating material flows through the bypass flow passage; and the pump control means controls the actuation of the gear pump such that more flow takes place than in a state of performing painting on an object of painting.

Effect of the Invention

According to the present invention, a painting robot can be provided, which enables effective deaeration when painting is performed using a painting head mounted on the tip end side of a robot arm.

DETAILED DESCRIPTION

A painting robot 10 according to embodiments of the present invention will be described below on the basis of the drawings. In the following description, as may be necessary, the X direction will be assumed to be the long direction of the nozzle forming surface 52 (painting head 53), the X1 side will be assumed to be the right side in FIG. 2, and the X2 side will be assumed to be the left side in FIG. 2. Furthermore, the Y direction will be assumed to be the short direction (width direction) of the nozzle forming surface 52 (painting head 53), the Y1 side will be assumed to be the top side of the page in FIG. 2, and the Y2 side will be assumed to be the bottom side of the page in FIG. 2.

The painting robot 10 of the present embodiment performs “painting” on an object of painting such as a vehicle or vehicle part (in the following, a vehicle part constituting a portion of a vehicle will be described as a vehicle) located on a painting line in an automobile manufacturing plant, for the purpose of forming a coating film on the surface of the object of painting so as to provide protection or improved appearance to that surface. Therefore, such a painting robot needs to perform painting, within a fixed period of time and at a desired painting quality, on vehicles that move along the painting line at predetermined intervals of time.

Furthermore, the painting robot 10 of the present embodiment can not only form a coating film as described above but can also form various types of designs and images on the object of painting, such as a vehicle or vehicle part.

(1-1. Overall Configuration of an Ink Jet Type Vehicle Painting Machine)

Figure 1:
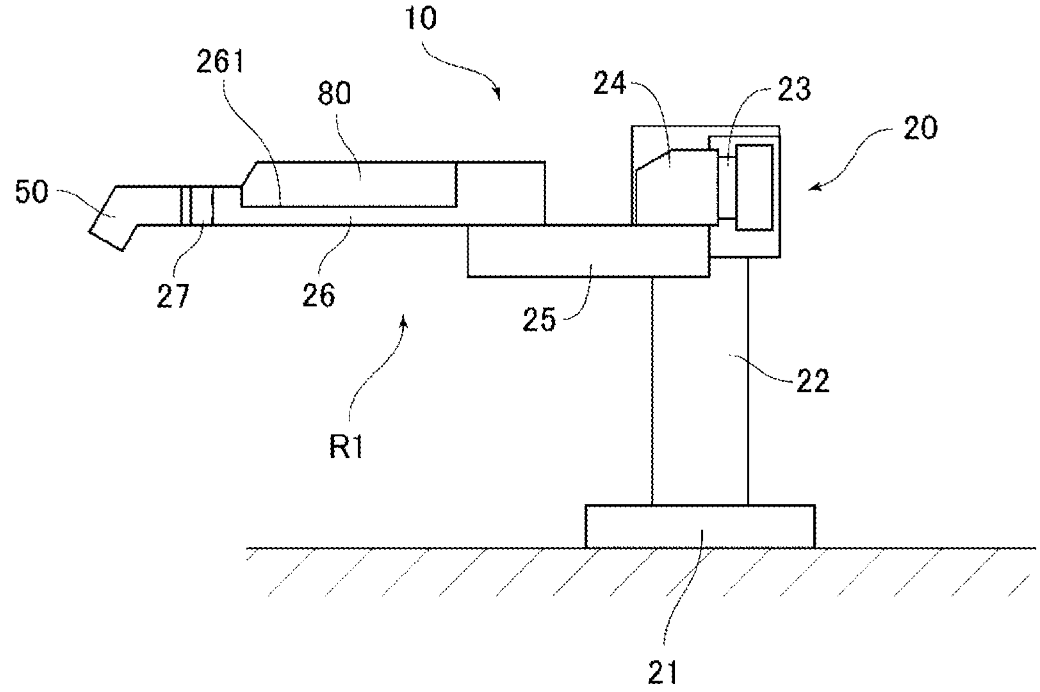
FIG. 1 is a schematic diagram illustrating the overall configuration of a painting robot according to an embodiment of the present invention.

FIG. 1 is a schematic diagram illustrating the overall configuration of a painting robot 10 according to a first embodiment of the present invention. As shown in FIG. 1, the painting robot 10 comprises a robot main body 20 and a painting head unit 50 as the main component elements.

(1-2. Painting Device Main Body)

As shown in FIG. 1, the robot main body 20 comprises a base 21, a leg part 22, a rotary shaft part 23, rotary arm 24, a first turning arm 25, a second turning arm 26, a wrist part 27, and unillustrated motors for driving these, as the main component elements. While the portion from the rotary shaft part 23 to the wrist part 27 corresponds to the robot arm R1, others parts such as the leg part 22 may also be treated as corresponding to the robot arm R1.

Among these, the base 21 is a part which is installed at an installation location such as a floor surface, but this base 21 may also be capable of travel relative to the installation location. Furthermore, the leg part 22 is a part installed vertically, extending from the base 21 upward. A joint part may be provided between the leg part 22 and the base 21 to allow the leg part 22 to turn relative to the base 21.

Furthermore, a rotary shaft part 23 is provided at the upper end of the leg part 22. A rotary arm 24 is mounted in a rotatable state on this rotary shaft part 23. Furthermore, the rotary arm 24 is rotated by driving with a motor (first motor), and an electric motor or air motor can be used as such a motor.

Furthermore, one end of a first turning arm 25 is mounted in a rotatable state on the rotary arm 24. It should be noted that a second motor (not illustrated) for rotating the first turning arm 25 relative to the rotary arm 24 may be contained in the housing of the rotary arm 24 or may be contained within the housing of the first turning arm 25.

Furthermore, on the other end of the first turning arm 25, one end of the second turning arm 26 is mounted in a swingable state across a shaft part. It should be noted that a third motor (not illustrated) for rotating the second turning arm 26 relative to the first turning arm 25 may be contained in the housing of the first turning arm 25 or may be contained within the housing of the second turning arm 26.

Here, the second turning arm 26 is provided with a module mounting part 261. The module mounting part 261 is a part for mounting a deaeration module 80, described later. It should be noted that the module mounting part 261 allows the deaeration module 80 to be mounted through fixation by fitment, but, for example, fixation with screws is also possible, and it is also possible to fix an unillustrated cover than covers the deaeration module 80 to the module mounting part 261 with screws or the like and then fix the deaeration module 80 via the cover. It will be noted that the module mounting part 261 is equivalent to an engagement part for mounting the deaeration module 80.

It will be noted that, in the above description, the deaeration module 80 was mounted to the module mounting part 261 of the second turning arm 26. However, the deaeration module 80 may also be disposed on the painting head unit 50 side, described later. Furthermore, the deaeration module 80 may be disposed at a stable location outside the robot arm R1.

It will be noted that a first flowmeter FM1 is mounted in the intermediate portion of the second turning arm 26 that is on the downstream side of the aforesaid deaeration module 80. Furthermore, a second flowmeter FM2, described later, is mounted in the intermediate portion of the second turning arm 26 that is on the downstream side of the paint regulator 119, described later.

Furthermore, a wrist part 27 is mounted on the other end of the second turning arm 26. The wrist part 27 enables rotational movement about axes of multiple (for example, three) different orientations. This makes it possible to control the orientation of the painting head unit 50 with good precision. It should be noted that the number of axes may be any number, provided that it is two or more.

To enable rotational movement about the respective axes of the wrist part 27, motors are provided (fourth through sixth motors; not illustrated). The fourth through sixth motors are contained within the housing of the second turning arm 26, but may also be housed elsewhere.

Furthermore, a painting head unit 50 is mounted via an unillustrated holder part to the wrist part 27. Namely, the painting head unit 50 is removably provided on the wrist part 27 via a holder part.

It will be noted that the painting robot 10 comprising the rotary shaft part 23, rotary arm 24, first turning arm 25, second turning arm 26, wrist part 27 and a first through sixths motors for driving these, as described above, is a robot that can be driven along six axes. However, the painting robot 10 may be a robot that is driven along whatever number of axes not less than four.

(1-3. Painting Head Unit)

Next, the painting head unit 50 will be described. A painting head unit 50 is mounted on the wrist part 27 via a chuck part, illustration of which will be omitted.

Figure 2:
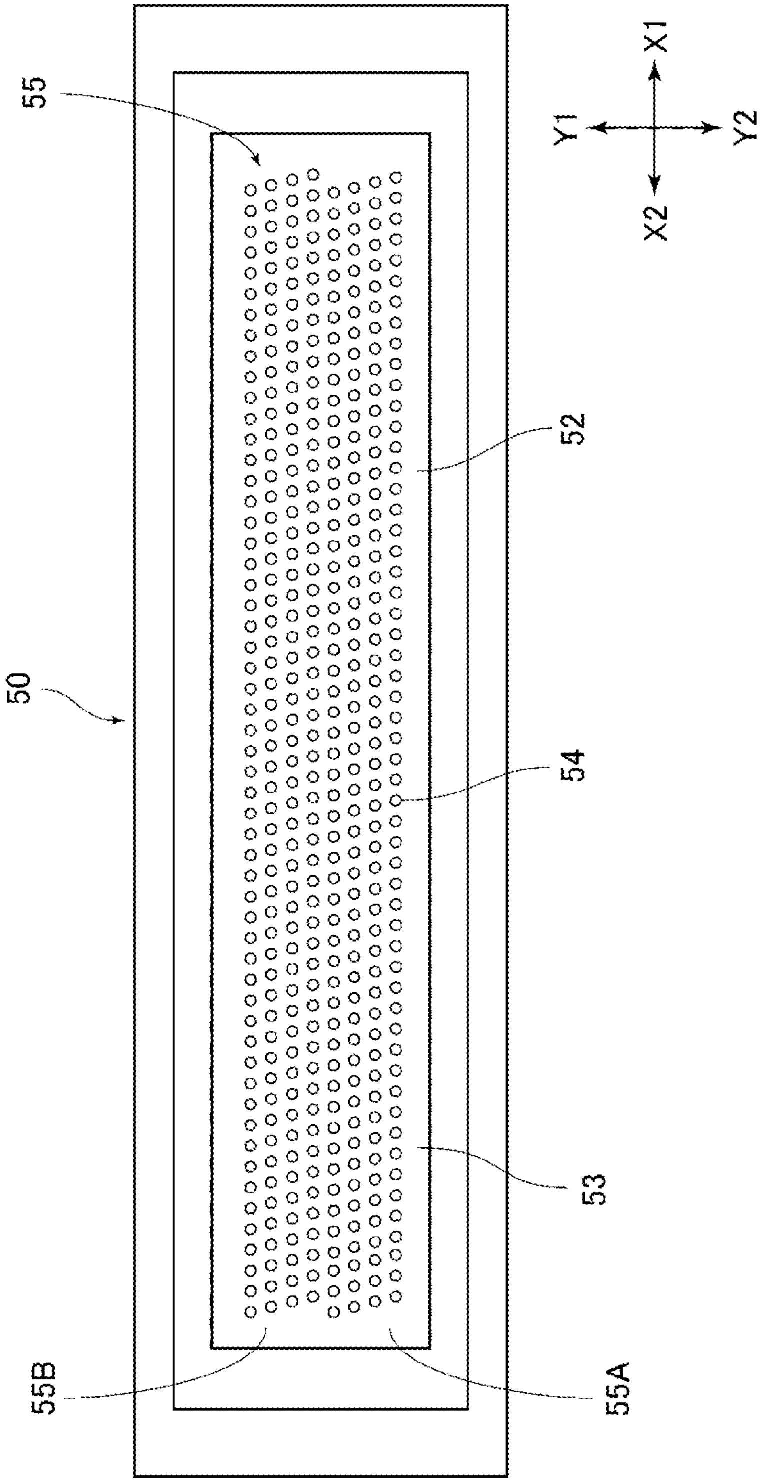
FIG. 2 is a drawing illustrating the state, in front view, of the nozzle forming surface from which coating material is ejected within the painting robot shown in FIG. 1.

FIG. 2 is a drawing illustrating the state of the nozzle forming surface 52 from which coating material is ejected within the painting head unit 50, in front view. As shown in FIG. 2, the painting head unit 50 comprises an unillustrated head cover, and various components are housed inside this head cover. As shown in FIG. 2, on the nozzle forming surface 52, there are provided multiple nozzle rows 55, in which nozzles 54 are arranged in a line tilted relative to the long direction of the painting head unit 50. For such nozzle rows 55, in the present embodiment, there are provided first nozzle rows 55A, located on one side (the Y2 side) in the main traversal direction (Y direction), and second nozzle rows 55B located on the other side (Y1 side) in the main traversal direction.

It will noted that, when ejecting coating material, the drive timing of the nozzles 54 is controlled such that liquid drops ejected from the nozzles 54 of the second nozzle rows 55B will land between the liquid drops ejected from adjacent nozzles 54 of the first nozzle rows 55A. As a result, the dot density during painting can be increased.

Figure 3:
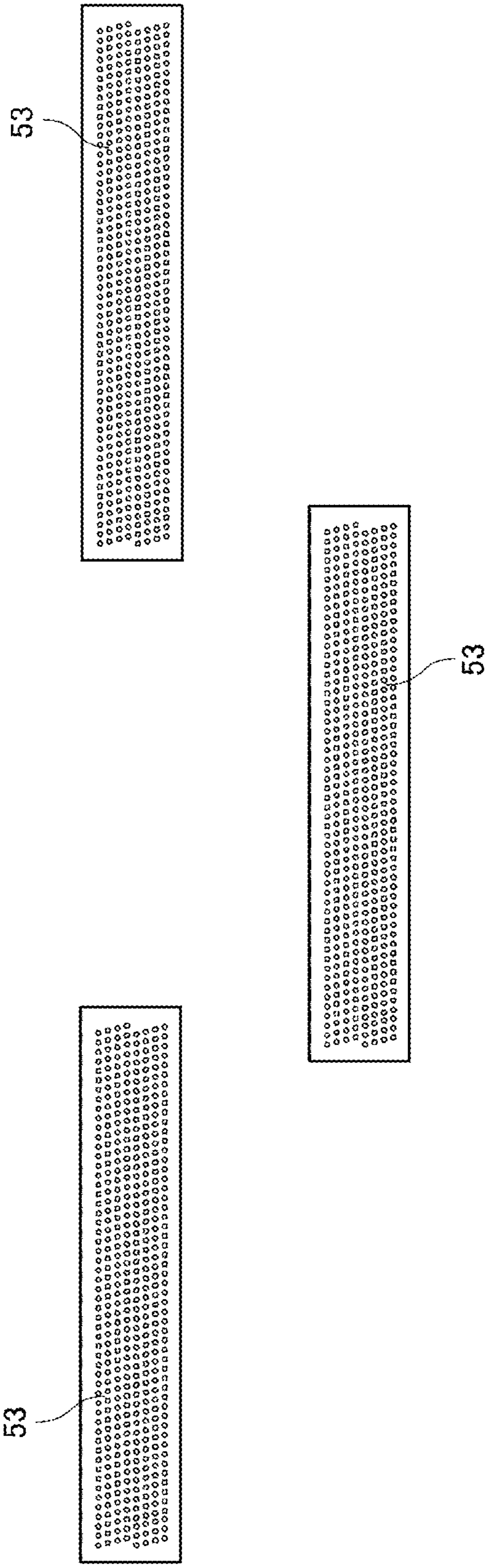
FIG. 3 is a drawing illustrating the state of multiple painting heads arranged in staggered fashion in the painting robot shown in FIG. 1.

On the nozzle forming surface 52 as shown in FIG. 2, a single painting head 53 is present. However, it is also possible for a group of heads consisting of multiple painting heads 53 to be present on the nozzle forming surface 52. In this case, for example, there can be a configuration in which multiple painting heads 53 are aligned and arranged in staggered fashion, as shown in FIG. 3, but the arrangement of the painting heads 53 in the group of heads may also be non-staggered.

Figure 4:
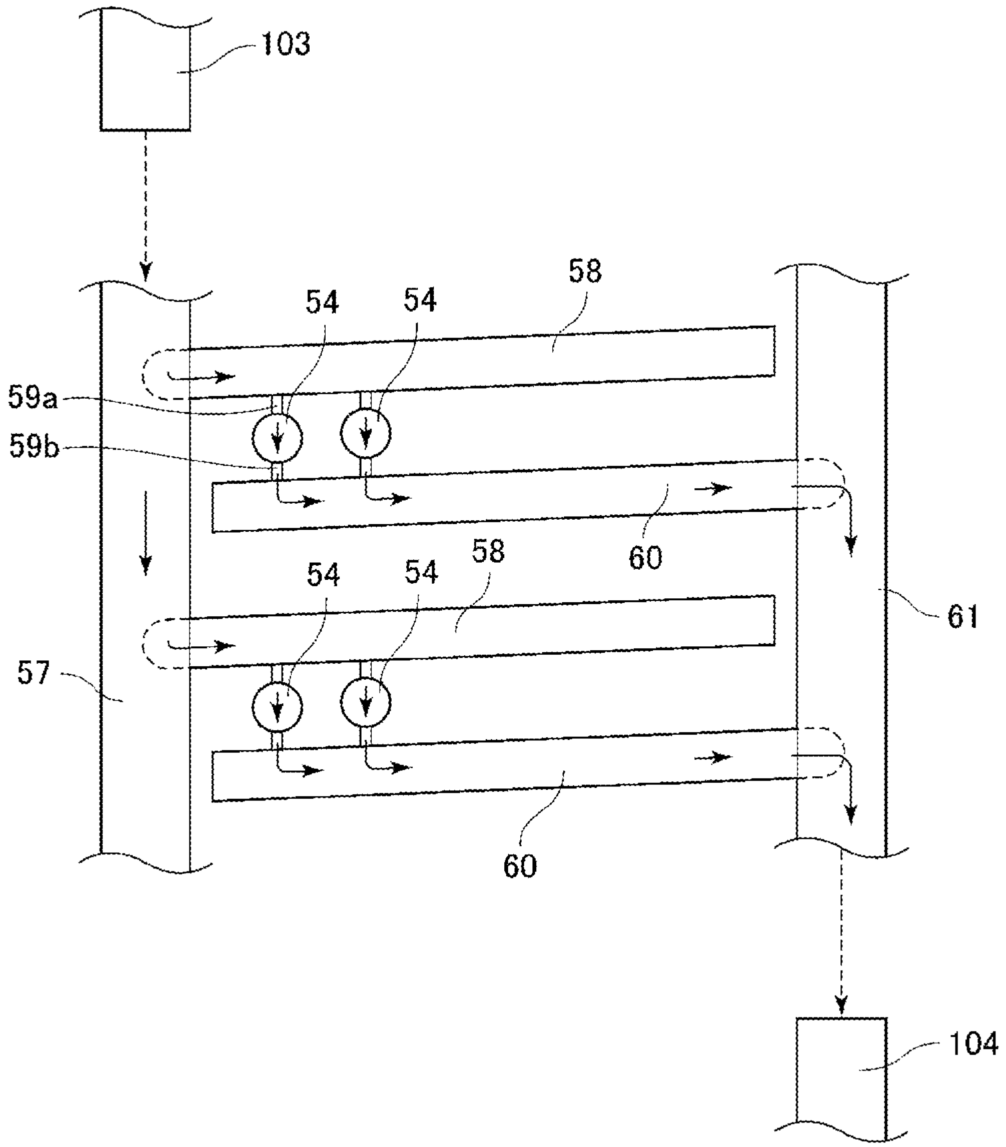
FIG. 4 is a drawing illustrating the schematic configuration for supplying coating material to nozzles in the painting robot shown in FIG. 1.
Figure 5:
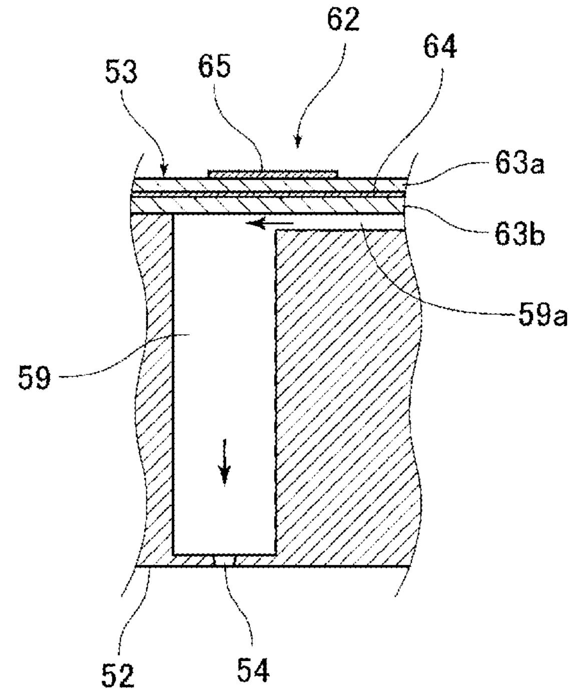
FIG. 5 is a cross-sectional view illustrating the configuration of the vicinity of the row direction supply flow passage, nozzle pressurization chamber and row direction evacuation flow passage shown in FIG. 4.

FIG. 4 is a drawing illustrating the schematic configuration for supplying coating material to the nozzles 54. FIG. 5 is a cross-sectional view illustrating the configuration of the vicinity of the row direction supply flow passage 58, nozzle pressurization chamber 59 and row direction evacuation flow passage 60. As shown in FIG. 4 and FIG. 5, the painting head 53 comprises a supply side large flow passage 57, a row direction supply flow passage 58, a nozzle pressurization chamber 59, a row direction evacuation flow passage 60, and an evacuation side large flow passage 61. The supply side large flow passage 57 is a passage through which coating material is supplied from the coating material supply passage 103 of the coating material supply mechanism 100, described later. Furthermore, the row direction supply flow passage 58 is a passage into which the coating material inside the supply side large flow passage 57 is diverted.

Furthermore, the nozzle pressurization chamber 59 is connected to the row direction supply flow passage 58 via nozzle supply flow passage 59*a*. As a result, coating material is supplied from the row direction supply flow passage 58 into the nozzle pressurization chamber 59. This nozzle pressurization chamber 59 is provided in accordance with the number of nozzles 54 and is able to cause the coating material inside it to be ejected from the nozzles 54 using a piezoelectric substrate 62, described later.

Furthermore, the nozzle pressurization chamber 59 is connected to the row direction evacuation flow passage 60 via a nozzle evacuation flow passage 59*b*. Therefore, coating material which that was not ejected from the nozzle 54 is evacuated from inside the nozzle pressurization chamber 59 via the nozzle evacuation flow passage 59*b* to the row direction evacuation flow passage 60. Furthermore, the row direction evacuation flow passage 60 is connected to evacuation side large flow passage 61. The evacuation side large flow passage 61 is a passage into which coating material that has been evacuated from the respective row direction evacuation flow passages 60 flows together. This evacuation side large flow passage 61 is connected to return flow passage 104 of the coating material supply mechanism 100, described later.

According to this configuration, coating material which has been supplied from the coating material supply passage 103 of the coating material supply mechanism 100, described later, passes through the supply side large flow passage 57, a row direction supply flow passage 58, a nozzle supply flow passage 59*a* and a nozzle pressurization chamber 59, and is ejected from a nozzle 54. Furthermore, coating material that was not ejected from the nozzle 54 passes from the nozzle pressurization chamber 59 through nozzle evacuation flow passage 59*b*, row direction evacuation flow passage 60 and evacuation side large flow passage 61 and is returned to the return flow passage 104 of the coating material supply mechanism 100, described later.

It should be noted that, in the configuration shown in FIG. 4, one row direction evacuation flow passage 60 is arranged in correspondence to one row direction supply flow passage 58. However, multiple (for example, two) row direction evacuation flow passages 60 may also be arranged in correspondence to one row direction supply flow passage 58. Furthermore, one row direction evacuation flow passage 60 may also be arranged in correspondence to multiple row direction supply flow passages 58.

Furthermore, as shown in FIG. 5, a piezoelectric substrate 62 is arranged on the ceiling of the nozzle pressurization chamber 59 (the surface on the opposite side from the nozzle 54). This piezoelectric substrate 62 comprises two piezoelectric ceramic layers 63*a*, 63*b*, which constitute piezoelectric elements, and furthermore comprises a common electrode 64 and individual electrodes 65. The piezoelectric ceramic layers 63*a*, 63*b* are members capable or extending and contracting upon application of voltage from the outside. Ceramic materials having ferroelectric properties, such as lead zirconate titanate (PZT) type, $NaNbO_3$ type, $BaTiO_3$ type, $(BiNa)NBO_3$ type or $BiNaNb_5O_{15}$ type materials, can be used for these piezoelectric ceramic layers 63*a*, 63*b*.

Furthermore, as shown in FIG. 5, the common electrode 64 is arranged between piezoelectric ceramic layer 63*a* and piezoelectric ceramic layer 63*b*. Furthermore, a surface electrode (not illustrated) for the common electrode is formed on the top surface of the piezoelectric substrate 62. The common electrode 64 and the surface electrode for the common electrode are electrically connected via an unillustrated through-conductor present in the piezoelectric ceramic layer 63*a*. Furthermore, the individual electrodes 65 are arranged at locations opposite the above-described nozzle pressurization chambers 59. Moreover, the portion of the piezoelectric ceramic layer 63*a* that is sandwiched between the common electrode 64 and the individual electrode 65 is polarized in the thickness direction. Therefore, when voltage is applied to the individual electrode 65, the piezoelectric ceramic layer 63*a* warps due to piezoelectric effect. Thus, when a predetermined drive signal is applied to the individual electrode 65, the piezoelectric ceramic layer 63*b* undergoes relative displacement so as to reduce the volume of the nozzle pressurization chamber 59, thereby causing the coating material to be ejected.

It should be noted that in FIG. 5, the common electrode 64 was arranged on the ceiling of the nozzle pressurization chamber 59, but the common electrode 64 is not limited to a configuration of being arranged on the ceiling of the nozzle pressurization chamber 59 as shown in FIG. 5. For example, it is possible to employ a configuration wherein the common electrode 64 is arranged on a side surface of the nozzle pressurization chamber 59 (a surface orthogonal or substantially orthogonal to the aforementioned ceiling), or any other configuration that allows the coating material to be efficiently ejected from the nozzle 54.

(1-4. Other Configurations of the Painting Head Unit)

Figure 6:
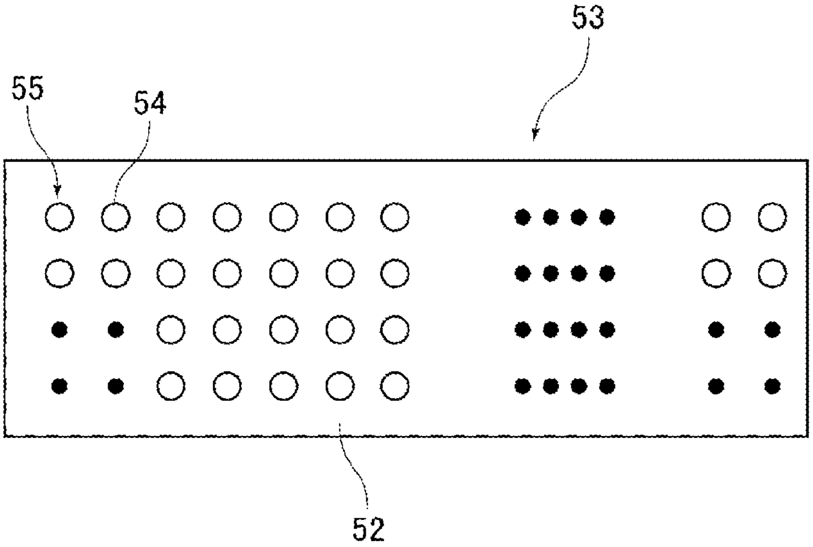
FIG. 6 is a plan view illustrating the configuration of the nozzle forming surface in another painting head unit different from the painting head unit shown in FIG. 2.

Next, other configurations of the painting head unit 50 will be described. FIG. 6 is a plan view illustrating another configuration of the nozzle forming surface 52 of the painting head unit 50. As shown in FIG. 6, multiple nozzles 54 may be lined up in the short direction (width direction; Y direction) of the painting head 53 to form a nozzle row 55. While the nozzle row 55 in the configuration shown in FIG. 6 was formed by lining up multiple nozzles 54 in the short direction (width direction; main traversal direction) of the painting head 53, a configuration may also be employed wherein only one (single) nozzle 54 is arranged in the short direction (width direction; main traversal direction) of the painting head 53. In other words, a nozzle row 55 may consist of one nozzle 54.

Furthermore, when painting is performed on a vehicle using a painting head 53 as shown in FIG. 6, painting may also be carried out in a state where the long direction of the painting head 53 is slightly tilted relative to the main traversal direction of the painting head 53. For example, in the configuration of the painting head 53 shown in FIG. 2, assuming that the nozzle rows 55 are tilted relative to the main traversal direction by an angle α, the long direction of the painting head 53 may also be tilted by an angle α relative to the main traversal direction of the painting head 53. When tilting in this manner, painting equivalent to that of the painting head 53 shown in FIG. 2 can be achieved simply by adjusting the ejection timing of coating material from the nozzles 54.

(1-5. Deaeration Module)

Figure 7:
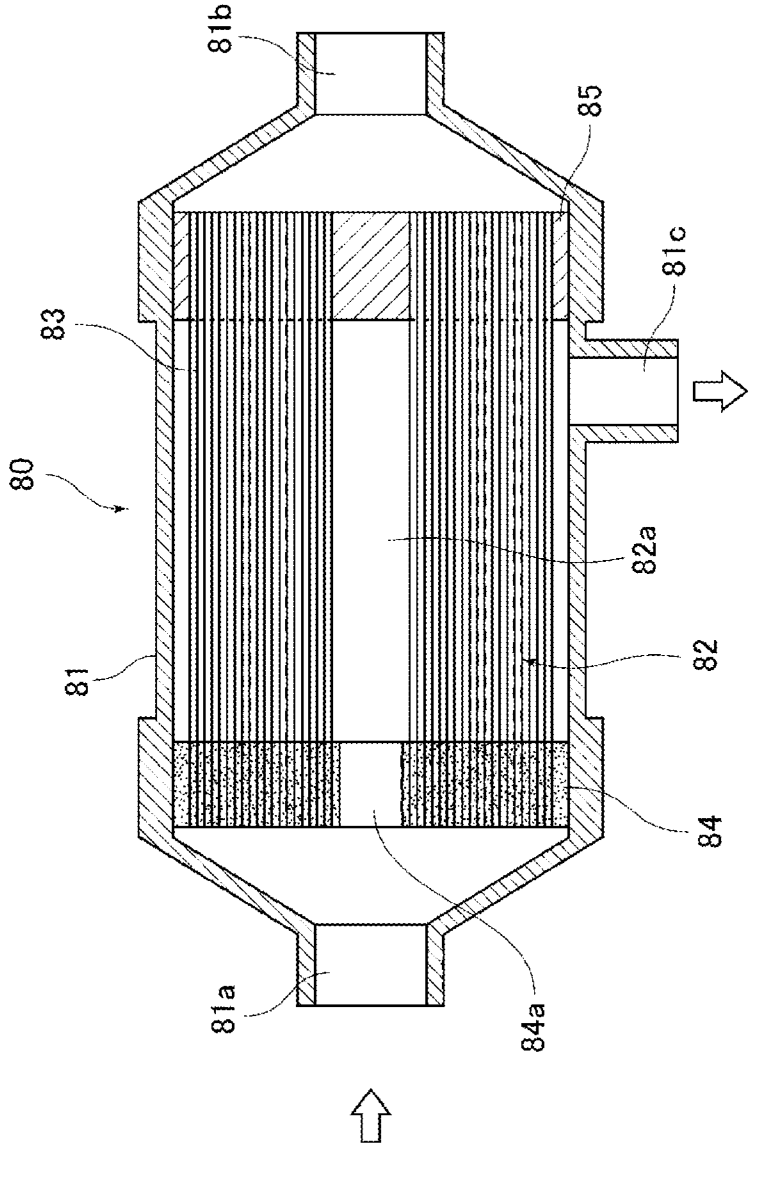
FIG. 7 is a cross-sectional view illustrating the schematic configuration of the deaeration module comprised by the painting robot shown in FIG. 1.

Next, the configuration of the deaeration module 80 will be described. FIG. 7 is a cross-sectional view illustrating the schematic configuration of the deaeration module 80. The deaeration module 80 is arranged to the downstream side of the removal filter 90, described later, in the coating material supply passage 103, and is a member intended for removal (deaeration) of dissolved gas present in solution in the coating material. It will be noted that the deaeration module 80 corresponds to the second filter. This deaeration module 80, as shown in FIG. 7, comprises a case member 81, a hollow fiber membrane bundle 82, an inflow side sealing member 84 and an evacuation side sealing member 85.

The case member 81 is a tubular member which houses the hollow fiber membrane bundle 82, inflow side sealing member 84 and evacuation side sealing member 85. On one end along the center line of this case member 81, illustration of which will be omitted, there is provided a coating material supply port 81*a*, and this coating material supply port 81*a* is connected to the upstream side of the coating material supply passage 103. Furthermore, on the other end along the center line of the case member 81, there is provided a suction port 81*b*, and this suction port 81*b* is connected via a suction pipe line 109 to a vacuum pump 110, described later. Thus, the pressure inside the case member 81 is reduced, and dissolved gases present in solution in the coating material are evacuated (deaerated) through the suction port 81*b*.

Furthermore, on a side surface of the case member 81, there is provided a coating material evacuation port 81*c*, and this coating material evacuation port 81*c* is connected to the downstream side of the coating material supply passage 103. Therefore, coating material that has flowed into the case member 81 flows through the coating material evacuation port 81*c* toward the downstream side.

The hollow fiber membrane bundle 82 is a member in which numerous hollow fiber membranes 83 are bundled, for example, in a cylindrical shape, one end of which (the end on the side from which coating material flows in) is secured to the inflow side sealing member 84 and the other end of which (the end on the side from which gases are evacuated) is secured to the evacuation side sealing member 85. The hollow fiber membranes 83 making up the hollow fiber membrane bundle 82 are hollow fiber-shaped membranes that allows gases to pass through but do not allow liquids made up of molecules larger than gases to pass through. Examples of the material of the hollow fiber membranes 83 include polypropylene, poly(4-methylpentene-1) and other polyolefin resins, polydimethylsiloxane, copolymers thereof, and other silicon resins, PTFE, vinylidene fluoride and other fluorine resins, etc. However, the material of the hollow fiber membranes 83 is not limited to these, and other materials may be used as well.

Furthermore, the membrane shape of the hollow fiber membranes 83 may be, for example, a porous membrane, a microporous membrane, a non-porous membrane without porosity, etc., but the membrane shape is not limited to these. Furthermore, the membrane morphology of the hollow fiber membranes 83 may be, for example, a homogenous symmetrical membrane (homogenous membrane) with a homogenous chemical or physical structure of the entire membrane, or an asymmetrical membrane wherein the chemical or physical structure of the membrane differs depending on the part, but the membrane morphology is not limited to these.

It should be noted that, for the hollow fiber membrane bundle 82, a hollow fiber membrane sheet can be used in which multiple hollow fiber membranes 83 are lined up and formed into the shape of sheet, and the hollow fiber membrane sheet can for instance be formed in a cylindrical shape. A hollow fiber membrane bundle 82 as shown in FIG. 7 is then formed by arranging multiple cylindrical hollow fiber membrane sheets of different diameters inside the case member 81. It will be noted that a central supply part 82 through which coating material is supplied is provided toward the center of the hollow fiber membrane bundle 82.

Furthermore, the inflow side sealing member 84 is formed, for example, using resin. At the radial center of this inflow side sealing member 84, there is provided a supply orifice 84*a* for supplying coating material to the central supply part 82*a*. It should be noted that the resin for forming the inflow side sealing member 84 may be of any sort so long as it is capable of preventing inflow of coating material into areas other than the supply orifice 84*a*.

Furthermore, the evacuation side sealing member 85, similarly to the inflow side sealing member 84, is formed, for example, using resin. However in the evacuation side sealing member 85, unlike the inflow side sealing member 84, there is no orifice formed in the radial center. Thus, it becomes difficult for coating material to pass through the evacuation side sealing member 85 and flow out to the suction port 81*b* side.

However, the presence of the aforementioned evacuation side sealing member 85 causes the coating material which has been supplied to the central supply part 82*a* to flow between the hollow fiber membranes 83 making up the hollow fiber membrane bundle 82 to the radially outer side of the case member 81. Actuating the vacuum pump 110 at this time to reduce the pressure inside the hollow fiber membranes 83 via the suction port 81*b* causes gases dissolved in the coating material to be drawn inside the hollow fiber membrane bundle 82 as the coating material passes between the hollow fiber membranes 83, thereby removing (deaerating) the dissolved gases from the coating material. Coating material which has been deaerated in this manner is supplied to the downstream side of the coating material supply passage 103 through the coating material evacuation port 81*c*.

While the deaeration module 80 was mounted to the module mounting part 261 of the second turning arm 26 described above, the deaeration module 80 may also be mounted on the module mounting part 261 across a casing which further covers the case member 81.

(1-6. Removal Filter)

Next, the removal filter 90 will be described. A removal filter 90 is provided on the upstream side from the deaeration module 80 in the coating material supply passage 103. The removal filter 90 removes foreign matter contained in the coating material flowing through the coating material supply passage 103.

Here, both water-based coating material and solvent-based coating material normally contains pigment ingredients within the coating material, and it is required that coarse foreign matter and pigment aggregates be reliably removed by the removal filter 90 from the coating material containing such pigment in order to maintain the ability of the painting head 53 to keep operating normally. Furthermore, solvent-based coating material often contains gel-like foreign matter within the coating material, and in many cases, air bubbles above a predetermined size are also contained in the coating material. Therefore, the removal filter 90 is required to remove such gel-like foreign matter and air bubbles above a predetermined size.

The removal filter 90 for removing coarse foreign matter, pigment aggregates, gel-like foreign matter and air bubbles as described above can be selected at one's discretion from the following. Specifically, for the removal filter 90, a mesh-like body such as a metal or resin net, or a porous body, or a meal plate in which fine through-holes have been formed can be used. As the mesh-like body, for example, metal mesh filters, metal fibers, e.g. fine strands of metal known as SUS made into the form of felt, metal sintered filters which have been compressed and sintered, electroformed metal filters, electron beam processed metal filters, laser beam processed metal filters, and the like can be used.

It should be noted that the removal filter 90 has a high precision hole diameter in order to on the whole reliably remove foreign matter above a fixed particle diameter. Furthermore, in order to prevent foreign matter in the coating material from reaching the nozzles 54, the aforementioned hole diameter, for example, when the openings of the nozzles 54 are round, is preferably less than the diameter of the openings of the nozzles 54.

It will be noted that the aforementioned removal filter 90 is fixated for example at its edge part with a fixation means such as a fixation housing, illustration of which will be omitted, and is thus placed into a state where passage of coating material through the removal filter 90 will not be impeded.

(1-7. First Configuration Example of Coating Material Supply Mechanism, Air Bubble Removal Member and Flowmeter)

Next, the coating material supply mechanism 100A and the air bubble removal member and flowmeter comprised by the coating material supply mechanism 100A according to a first configuration example will be described. It should be noted that, in the following description, the coating material supply mechanism 100A according to the first configuration example may be referred to simply as coating material supply mechanism 100 in cases where there is no particular need to distinguish between it and the coating material supply mechanism 100B according to the second configuration example.

Figure 8:
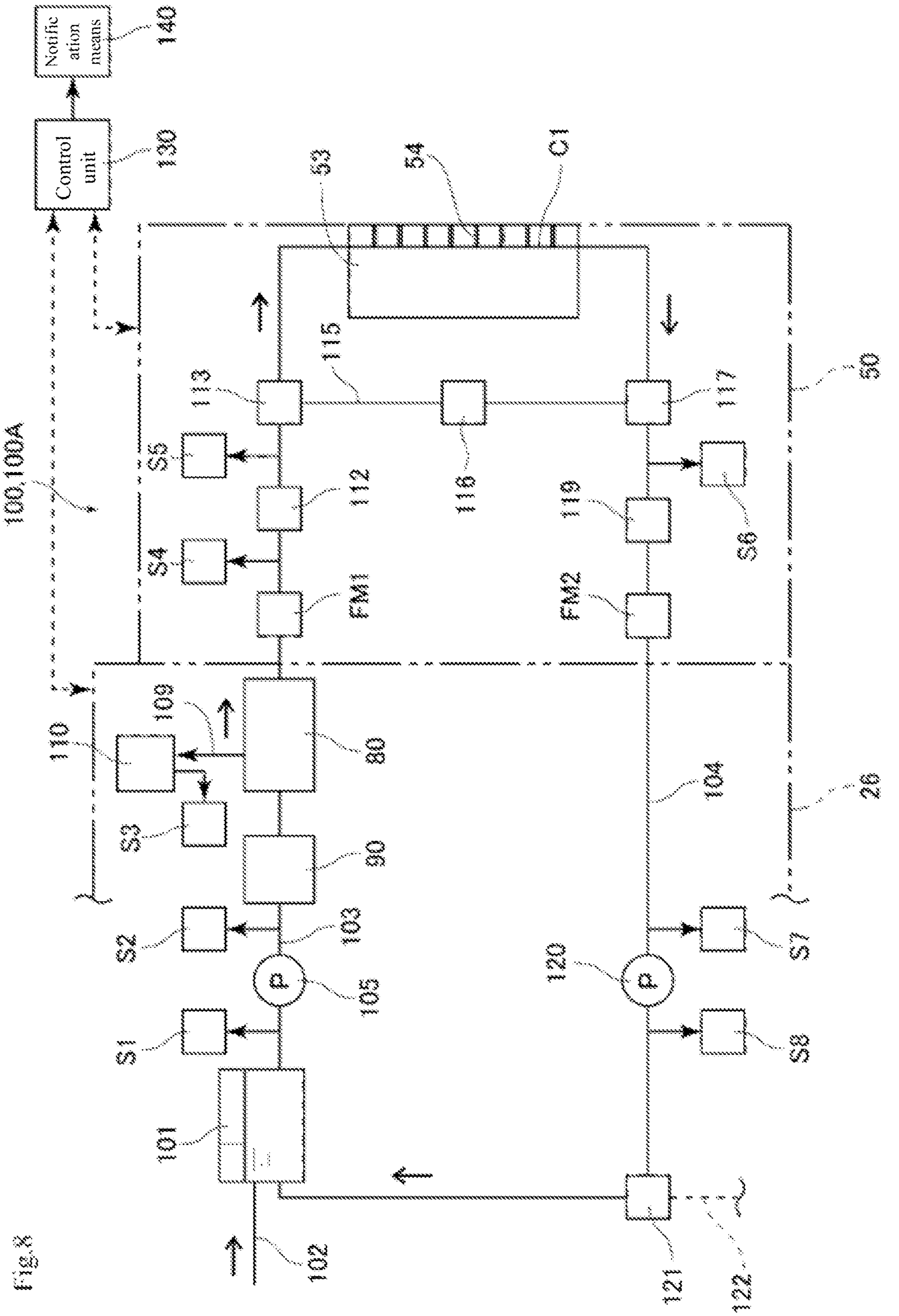
FIG. 8 is a drawing illustrating the schematic configuration of the coating material supply mechanism, etc., according to a first configuration example, comprised by the painting robot shown in FIG. 1.

FIG. 8 is a drawing illustrating the schematic configuration of the coating material supply mechanism 100A, etc. according to the first configuration example. This coating material supply mechanism 100A comprises an air bubble removal member 101, an external supply passage 102, a coating material supply passage 103, a return flow passage 104, a supply pump 105, pressure sensors S1 through S8, a first flowmeter FM1 and a second flowmeter FM2.

Figure 9:
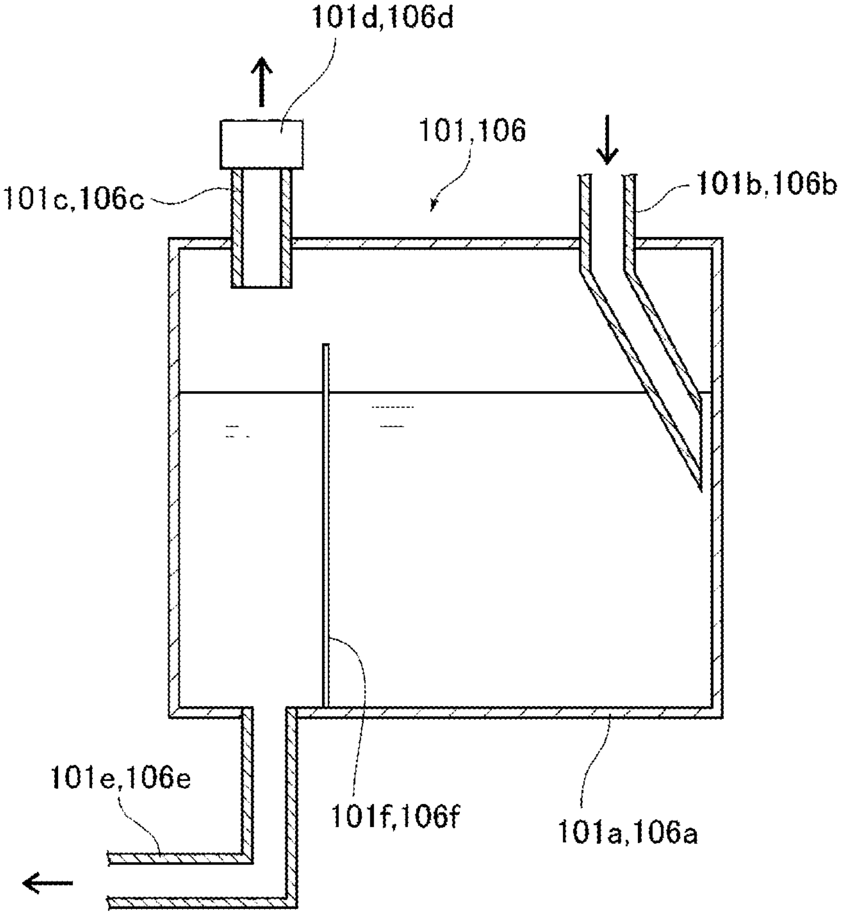
FIG. 9 is a drawing illustrating the configuration of the first air bubble removal member and second air bubble removal member present in the coating material supply mechanism shown in FIG. 8.

FIG. 9 is a drawing illustrating the configuration of the air bubble removal member 101. It will be noted that the air bubble removal member 101 corresponds to the air bubble removal means. Furthermore, the air bubble removal member 101 may also be disposed at a stable location other than the robot arm R1, such as the base 21, the leg part 22, the installation surface on which the robot main body 20 is installed, etc. As shown in FIG. 9, the air bubble removal member 101 comprises a tank main body 101*a*, a coating material introduction pipe line 101*b*, a gas evacuation pipe line 101*c*, and air evacuation valve 101*d*, and a coating material evacuation pipe line 101*e*. The tank main body 101*a* is a hollow vessel-shaped member capable of storing coating material inside.

Furthermore, the coating material introduction pipe line 101*b* is a pipe line for introducing coating material into the tank main body 101*a*. It should be noted that the end (outlet) of the coating material introduction pipe line 101*b* inside the tank main body 101*a* is preferably located in the lower part of the tank main body 101*a*. Furthermore, the end (outlet) of the coating material introduction pipe line 101*b* inside the tank main body 101*a* is preferably located near the inner wall of the tank main body 101*a*.

Furthermore, the gas evacuation pipe line 101*c* is a pipe line for evacuating gases (including gases due to rupture of air bubbles, etc.) accumulated inside the tank main body 101*a*. The end of this gas evacuation pipe line 101*c* inside the tank main body 101*a* is preferably located in the upper part of the tank main body 101*a* in order to improve the gas evacuation characteristics. It will be noted that the end of the gas evacuation pipe line 101*c* inside the tank main body 101*a* corresponds to the evacuation port.

Furthermore, at a predetermined location in the gas evacuation pipe line 101*c*, there is provided an air evacuation valve 101*d*. For this air evacuation valve 101*d*, for example, a control valve that can be opened and closed by the control unit 130 can be used. In this case, the control unit 130 corresponds to the valve control means. Furthermore, a relief valve capable of opening automatically when the pressure inside the tank main body 101*a* rises above a predetermined level without relying on control by the control unit 130 can also be used as the air evacuation valve 101*d*.

It should be noted that a configuration in which such an air evacuation valve 101*d* is not provided may be employed as well. For example, the gas evacuation pipe line 101*c* may be connected to a suction pump, etc. so as to maintain the tank main body 101*a* at a slightly negative pressure, thereby promoting the evacuation of gases from inside the tank main body 101*a*.

Furthermore, the coating material evacuation pipe line 101*e* is a pipe line for evacuating (passing) coating material accumulated inside the tank to the coating material supply passage 103 side. Namely, the air bubble removal member 101 is provided so as to allow coating material to be supplied to the coating material supply passage 103. It will be noted that the end of the coating material evacuation pipe line 101*e* inside the tank main body 101*a* needs to be located below the liquid surface of the coating material so as to not evacuate gases through the coating material evacuation pipe line 101*e* into the external supply passage 102, so the end of the coating material evacuation pipe line 101*e* inside the tank main body 101*a* is preferably located in the lower part of the tank main body 101*a*. It will be noted that the end of the coating material evacuation pipe line 101*e* inside the tank main body 101*a* corresponds to the outflow port.

If coating material is to be simply supplied toward the painting head unit 50, it is also conceivable to connect the external supply passage 102 directly to the coating material supply passage 103. To explain this with reference to currently existing painting plants, in currently existing painting plants, coating material flows from a large coating material storage location such as a circulation tank to a main pipe, and is supplied to the painting robot via a branch pipe (external supply passage 102 or a pipe line to which the external supply passage 102 is connected) that branches from the main pipe into a painting booth on the painting line. In such a supply passage, relatively high pressure is applied to the coating material, but if coating material is supplied at such high pressure to the painting head unit 50, the high pressure may, for example, cause coating material to be inadvertently sprayed out from the nozzles 54 of the painting head unit 50.

Thus, in the present embodiment, providing an air bubble removal member 101 comprising a tank main body 101*a* in the coating material supply mechanism 100A allows this air bubble removal member 101 (tank main body 101*a*) to function as a buffer that prevents the aforementioned high pressure from acting directly upon the painting head unit 50. Namely, the external supply passage 102 for supplying coating material from an external coating material storage area is connected to the air bubble removal member 101 (tank main body 101*a*); the external supply passage 102 is not connected directly to the coating material supply passage 103. Further to the downstream side of the coating material supply passage 103 from the air bubble removal member 101 (tank main body 101*a*), rather than having coating material supplied via the external supply passage 102 to the air bubble removal member 101 (tank main body 101*a*), coating material is fed at low pressure toward the painting head unit 50 by the supply pump 105.

Furthermore, when employing a configuration in which an air bubble removal member 101 (tank main body 101*a*) is provided as described above, it is necessary to prevent dirt and the like from being admixed into the coating material. Thus, a tank main body 101*a* that is completely closed off from outside, including at the top, is used as the part for temporarily storing the coating material, rather than using a vessel that is open at the top.

However, in a configuration that is completely closed off from outside, such as that of the tank main body 101*a*, depending on the remaining quantity of coating material inside the tank main body 101*a*, the pressure inside the tank main body 101*a* will fluctuate and will not be constant.

Furthermore, in a configuration where the painting head unit 50 is mounted on a robot arm R1, normally, a configuration is employed wherein the air bubble removal member 101 (tank main body 101*a*) is installed outside the robot arm R1. In this case, the distance from the tank main body 101*a* to the painting head unit 50 on the robot arm R1 side becomes longer, so it is preferable to feed the coating material to the painting head unit 50 side from the tank main body 101*a* side by applying an appropriate pressure.

In such a case, it is preferable for the tank main body 101*a* to be a tank that allows pressurization of the coating material inside, such as a pressure feed tank, but in the present embodiment, as described above, a tank main body 101*a* is employed that is closed off from the outside, and the coating material inside the tank main body 101*a* is pressurized and fed toward the painting head unit 50 by means of a supply pump 105 (for example, a gear pump) that is driven and controlled by the control unit 130. In this way, coating material is fed toward the painting head unit 50 while avoiding pressure fluctuations inside the tank main body 101*a*.

It will be noted that the term "appropriate pressure" as used here signifies a pressure that is lower than the supply pressure of coating material in a branch pipe (external supply passage 102 or a pipe line connected to external supply passage 102) than branches off from the main pipe, and that is at a level such that, when such "appropriate pressure" is applied, coating material can be supplied to the nozzles 54 and can be prevented from inadvertently being sprayed out from the nozzles 54.

Incidentally, small bubbles with a diameter of, for example, 50 μm or less (microbubbles) have the property of not floating to the top of a liquid immediately but rather remaining suspended inside the liquid. When such microbubbles are mixed into the coating material, there is the concern that air bubbles may again flow from the coating material evacuation pipe line 101*e* to the coating material supply passage 103.

For this reason, a partition filter 101*f* may be installed inside the tank main body 101*a*, as shown for example in FIG. 9. This partition filter 101*f* is arranged so as to completely demarcate the coating material introduction pipe line 101*b* side from the coating material evacuation pipe line 101*e* side inside the tank main body 101*a*. Thus, coating material which has flowed from the coating material introduction pipe line 101*b* into the tank main body 101*a* will not be able to flow from the coating material evacuation pipe line 101*e* to the coating material supply passage 103 unless it passes through the partition filter 101*f*.

Here, the partition filter 101*f* is preferably a filter that has a fine pore diameter that is smaller than the microbubbles described above. In this case, many of the microbubbles will be unable to pass through partition filter 101*f* and will be trapped by the partition filter 101*f*, making it possible to reduce the amount of air bubbles in the coating material passing through the partition filter 101*f*. It should be noted that, for the partition filter 101*f*, similarly to the previously described removal filter 90, a mesh-like body such as a metal or resin net, or a porous body, or a meal plate in which fine through-holes have been formed can be used. As the mesh-like body, for example, metal mesh filters, metal fibers, e.g. fine strands of metal known as SUS made into the form of felt, metal sintered filters which have been compressed and sintered, electroformed metal filters, electron beam processed metal filters, laser beam processed metal filters, and the like can be used.

Furthermore, fine air bubbles such as microbubbles normally carry a negative electric charge. Thus, the air bubbles may be trapped by imparting an electrostatic charge to the partition filter 101*f* such that it carries a positive electric charge, or conversely, air bubbles may be prevented from passing through the partition filter 101*f* by imparting a negative electrostatic charge to it. Furthermore, air bubbles may be trapped by imparting a positive electrostatic charge to a separate electrostatic charging means.

Figure 10:
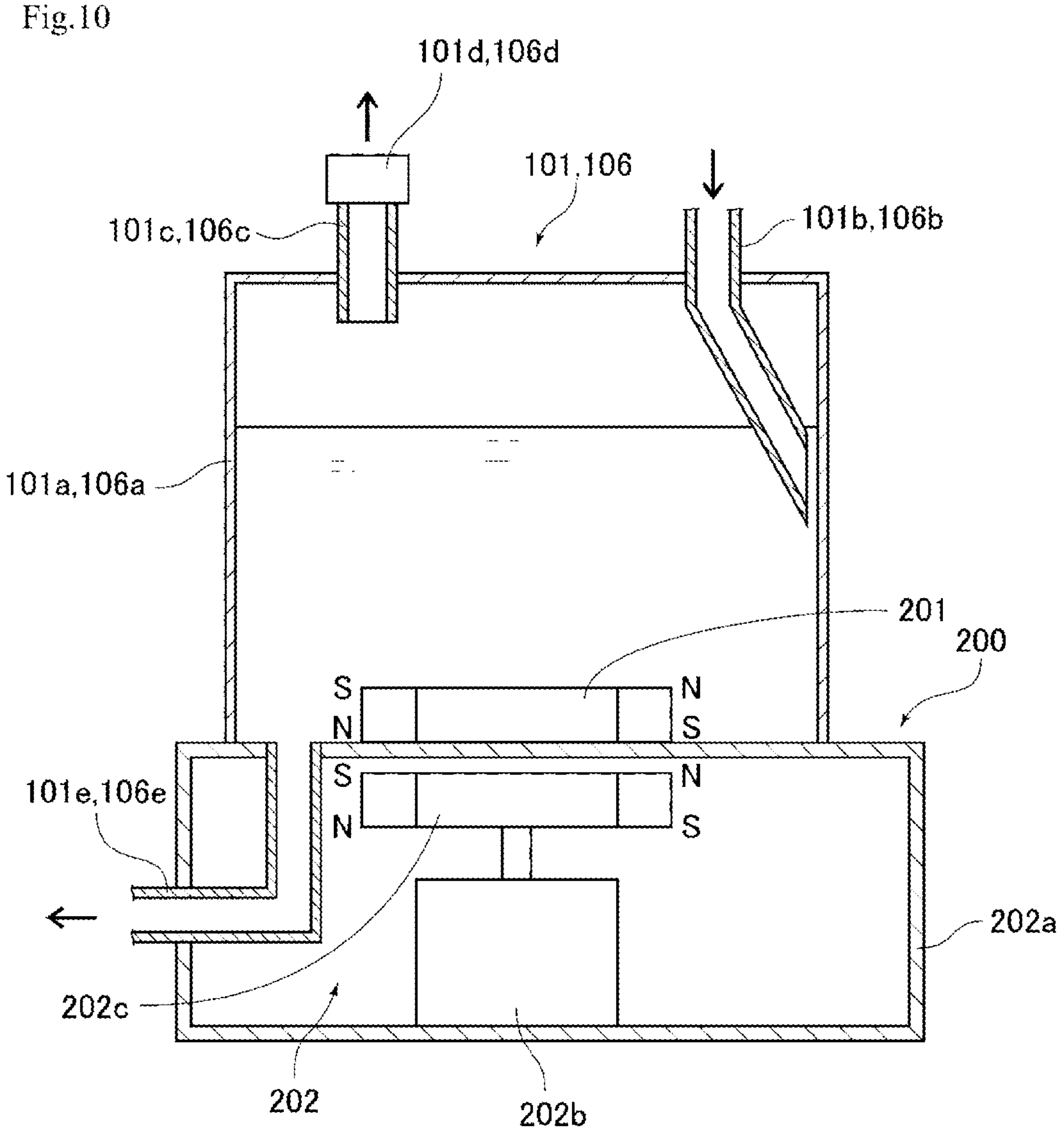
FIG. 10 is a drawing illustrating the configuration of a modified example of the first air bubble removal member and second air bubble removal member shown in FIG. 9.

Furthermore, as shown in FIG. 10, a stirrer 200 may be arranged in the air bubble removal member 101 to rotate the coating material. Such a stirrer 200 comprises a stirring element 201 and a stirring element driving device 202. Furthermore, the stirring element driving device 202 comprises a case member 202*a*, and a motor 202*b* and drive magnet 202*c* housed in the case member 202*a*.

Of these, the stirring element 201 is an elongated magnet member, which is arranged inside the tank main body 101*a*. In the configuration shown in FIG. 10, the thickness direction at one end of the stirring element 201 and the thickness direction at the other end are magnetized to different magnetic polarities. However, a configuration in which one end and the other end of the stirring element 201 are magnetized to different magnetic polarities may be used as well. The case member 202*a* is a member which houses the motor 202*b* and the drive magnet 202*c*. The motor 202*b* provides driving force that rotates the drive magnet 202*c*.

Furthermore, the drive magnet 202*c* is an elongated magnet member which is rotated by the motor 202*b*, the thickness direction of one end of which is magnetized to a different magnetic polarity than the thickness direction of the other end. However, similarly to the stirring element 201 described above, a configuration in which one end and the other end of the drive magnet 202*c* are magnetized to different polarities may be used as well. Namely, the magnetized portion of the drive magnet 202*c* is provided so as to magnetically connect to the magnetized portion of the stirring element 201.

On the basis of such a configuration, in the state where the magnetized portions of the drive magnet 202*c* and the stirring element 201 are attracted to each other by magnetic force, when the motor 202*b* is driven to rotate the drive magnet 202*c*, the stirring element 201 inside the tank main body 101*a* rotates as well. As a result, the coating material inside the tank main body 101*a* is rotated, at which time the coating material, which has a high density, moves outward due to the action of centrifugal force, and air bubbles, which have a low density, gather toward the center of the rotating coating material. Thus, it becomes possible to remove air bubbles from the coating material by evacuating the outer portion of the coating material rotating in the tank main body 101*a* through the coating material evacuation pipe line 101*e* to the coating material supply passage 103 side.

It will be noted that rotating the coating material inside the tank main body 101*a* as described above causes the shear velocity in the coating material to rise, thus making it possible to reduce the viscosity of the coating material. Furthermore, this makes it possible to prevent precipitation of pigment contained in the coating material.

Furthermore, an external supply passage 102 is connected to the above-described air bubble removal member 101 (tank main body 101*a*). The external supply passage 102 is a pipe line for supplying coating material supplied from a coating material storage area, such as a circulation tank, into the tank main body 101*a*.

Furthermore, the coating material supply passage 103 is a flow passage for supplying coating material from the air bubble removal member 101 toward the painting head 53, and is connected to the supply side large flow passage 57 described above.

Furthermore, the return flow passage 104 is connected to the evacuation side large flow passage 61 of the painting head 53, and is a flow passage for returning coating material which was not ejected at the painting head 53, to the air bubble removal member 101.

Furthermore, the supply pump 105 is connected to an intermediate portion of the coating material supply passage 103, and is a means for applying positive pressure to the coating material flowing through the coating material supply passage 103. It should be noted that a gear pump whereof the rotational speed can be controlled so as to control the coating material supply rate is preferably used as the supply pump 105. However, pumps other than a gear pump may also be used for the supply pump 105.

Here, a pressure sensor S1 is arranged on the upstream side of the supply pump 105 in the coating material supply passage 103. In addition, a pressure sensor S2 is arranged to the downstream side of the supply pump 105 in the coating material supply passage 103 but to the upstream side of the removal filter 90. Pressure sensor S1 measures the supply pressure of coating material to the supply pump 105 and transmits the measurement result to the control unit 130. Furthermore, pressure sensor S2 measures the pressure of coating material ejected from the supply pump 105, and transmits the measurement result to the control unit 130.

Measuring the pressure of the coating material on the upstream side and downstream side of the supply pump 105 by means of the pressure sensors S1, S2 in this manner makes it possible to adjust the application of pressure on the removal filter 90 side through actuation of the supply pump 105 with high precision. Therefore, it becomes possible to prevent the removal filter 90 from being damaged due to application of pressure above the rated level to the removal filter 90, and to prevent foreign matter from passing through the removal filter 90.

Furthermore, a vacuum pump 110 is connected via a suction pipe line 109 to the deaeration module 80. The vacuum pump 110, as described above, is a device for reducing the pressure inside the case member 81 of the deaeration module 80 (inside the hollow fiber membranes 83). Through such pressure reduction, dissolved gases present in solution in the coating material which has been supplied into the case member 81 are removed (deaerated). It should be noted that the suction pipe line 109 is also connected to suction port 81*b* of the case member 81, described above, in addition to being connected to the vacuum pump 110.

Furthermore, pressure sensor S3 measures the pressure in the suction pipe line 109 between the vacuum pump 110 and the deaeration module 80.

Moreover, a first flowmeter FM1 is arranged in the coating material supply passage 103 on the downstream side of the deaeration module 80 and on the upstream side of the paint regulator 112. The first flowmeter FM1 measures the flow rate of coating material fed to the paint regulator 112, and transmits the measurement result to the control unit 130. This first flowmeter FM1 is a non-contact type flowmeter without moving parts, such as an ultrasonic type, optical type, electromagnetic type or thermal type flowmeter, so the first flowmeter FM1 is installed outside the coating material supply passage 103. It will be noted that a flowmeter having moving parts may also be used as the first flowmeter FM1.

Here, in the case that the first flowmeter FM1 is of optical type, at least the portion of the coating material supply passage 103 where flow rate is measured with the first flowmeter FM1 is made transparent. However, in the case that the first flowmeter FM1 is not optical type but rather ultrasonic type, there is no need to make transparent at least the portion of the coating material supply passage 103 where flow rate is measured with the first flowmeter FM1.

Furthermore, a pressure sensor S4 is provided on the downstream side of the first flowmeter FM1 to measure the pressure in this portion of the coating material supply passage 103, and on the basis of the measurement result for this pressure, the control unit 130, described later, performs feedback control of the operation of the supply pump 105. Namely, even if the supply pump 105 were to operate according to the level of congestion of the removal filter 90 and the deaeration module 80, the pressure drop on the downstream side of the removal filter 90 and deaeration module 80 would fluctuate. Thus, on the basis of the pressure difference between pressure sensor S2 and pressure sensor S4, the control unit 130 determines what level of pressure is being applied to the removal filter 90 and the deaeration module 80. In this way, the supply pump 105 can be controlled so as to apply an appropriate pressure to the removal filter 90 and the deaeration module 80. Furthermore, depending on the degree of congestion of the removal filter 90 and the deaeration module 80, the control unit 130 announces that it is time to replace these.

While it is preferable for the aforementioned pressure sensor S4 to be provided in the coating material supply mechanism 100A, a configuration in which this pressure sensor S4 is omitted may be employed as well. Furthermore, the pressure sensor S4 may be disposed either on the painting head unit 50 side or on the second turning arm 26 side (robot arm R1 side). Furthermore, the pressure sensor S4 may be disposed on the upstream side of the first flowmeter FM1.

Furthermore, a paint regulator 112 is arranged in the coating material supply passage 103 on the downstream side of the deaeration module 80. The paint regulator 112 moderates the pulsation of the supply pump 105 to supply coating material at a constant pressure. This paint regulator 112 has a shutoff valve whereof the degree of opening can be adjusted on the basis of control air pressure or an electrical signal, and the pressure of the coating material flowing through the coating material supply passage 103 and the ejection rate thereof are controlled by adjusting the degree of valve opening of this shutoff valve. A paint regulator comprising, for example, an air actuated shutoff valve can used as the paint regulator 112, but a pressure regulator comprising an electric or electromagnetic shutoff valve may be used as well. As the shutoff valve, for example, a proportional control valve can be used, but a servo valve may be used as well.

It will be noted that pressure sensor S5 measures pressure in the coating material supply passage 103 on the downstream side of the paint regulator 112 and on the upstream side of the bypass flow passage 115.

Furthermore, the coating material supply passage 103 is connected to a three-way valve 113 on the downstream side of the paint regulator 112. This three-way valve 113 is connected to an intermediate portion of the coating material supply passage 103 and is also connected to the bypass flow passage 115. Therefore, during painting, the upstream side and the downstream side of the coating material supply passage 103 from the three-way valve 113 are in an open state, and coating material is supplied to the painting head 53. On the other hand, when painting is not being performed, the valve is switched such that coating material flows from the coating material supply passage 103 to the bypass flow passage 115, but no coating material is supplied to the downstream side of the coating material supply passage 103 (the painting head 53 side).

Furthermore, the bypass flow passage 115 is a flow passage that connects the coating material supply passage 103 to the return flow passage 104. Namely, the bypass flow passage 115 is provided in parallel to the painting head 53, and when coating material ceases to be ejected from the painting head 53, the operation of the aforementioned three-way valve 113 is switched such that the coating material flows into the bypass flow passage 115.

A shutoff valve 116 is provided in an intermediate portion of this bypass flow passage 115. Operating this shutoff valve 116 so as to open the valve makes it possible for coating material to flow through the bypass flow passage 115.

Furthermore, on the downstream side of the shutoff valve 116 in the bypass flow passage 115, there is connected a three-way valve 117, and the upstream side of the return flow passage 104 (i.e. the painting head 53 side of the return flow passage 104) and the downstream side of the same (i.e. the suction pump (described later) side of the return flow passage 104) are also connected to this three-way valve 117. Thus, when painting is performed, the upstream side and downstream side of the return flow passage 104 from the three-way valve 117 are in an open state, and coating material that was not ejected from the painting head 53 flows to the downstream side of the return flow passage 104. On the other hand, when painting is not performed, the three-way valve 117 is switched such that the coating material flowing through bypass flow passage 115 will flow to the downstream side (suction pump side) of the return flow passage 104.

Furthermore, a paint regulator 119 is arranged on the downstream side of the return flow passage 104 from the three-way valve 117. The paint regulator 119 moderates the pulsation of the suction pump 120 so that the coating material is suctioned at a constant pressure. As a result, it becomes possible to prevent air from being drawn in through the nozzles 54 and admixed into the coating material when the negative pressure becomes large due to pulsation in the suction pump 120. It will be noted that paint regulator 119, similarly to paint regulator 112 described above, has a shutoff valve that allows the degree of opening to be adjusted on the basis of control air pressure or an electric signal, and the negative pressure exerted on the coating material flowing through the return flow passage 104 is controlled by adjusting the degree of valve opening of this shutoff valve. A paint regulator comprising, for example, an air actuated shutoff valve can used as the paint regulator 119, but a pressure regulator comprising an electric or electromagnetic shutoff valve may be used as well. As the shutoff valve, for example, a proportional control valve can be used, but a servo valve may be used as well.

Pressure sensor S6 measures the pressure in the return flow passage 104 on the upstream side of the paint regulator 119 and on the downstream side of the three-way valve 117.

Furthermore, a second flowmeter FM2 is arranged on the downstream side of paint regulator 119 in the return flow passage 104. The second flowmeter FM2 measures the flow rate of coating material fed to the suction pump 120, and transmits the measurement result to the control unit 130. This second flowmeter FM2, similarly to the first flowmeter FM1 described above, is a non-contact type flowmeter without moving parts, such as an ultrasonic type, optical type, electromagnetic type or thermal type flowmeter, so description of the details thereof will be omitted. It will be noted that a flowmeter having moving parts may also be used as the second flowmeter FM2.

Furthermore, the suction pump 120 is connected to the return flow passage 104 on the downstream side of the second flowmeter FM2, and exerts negative pressure on the coating material flowing through this return flow passage 104. It should be noted that a gear pump whereof the rotational speed can be controlled so as to control the coating material supply rate is preferably used as the suction pump 120, just as in the case of the supply pump 105 described above. However, pumps other than a gear pump may also be used for the suction pump 120.

Furthermore, a pressure sensor S7 is arranged in the return flow passage 104 on the upstream side of the suction pump 120. In addition, a pressure sensor S8 is arranged in the return flow passage 104 on the downstream side of the suction pump 120 and on the upstream side of switching valve 121, described later. Pressure sensor S7 measures the pressure (negative pressure) of coating material fed to the suction pump 120, and transmits the measurement result to the control unit 130. Furthermore, pressure sensor S8 measures the pressure of coating material ejected from the suction pump 120, and transmits the measurement result to the control unit 130.

Furthermore, a switching valve 121 is arranged in the return flow passage 104 on the downstream side of the suction pump 120. This switching valve 121 is a three-way valve, and is connected to an evacuation passage 122 in addition to being connected to the upstream side and downstream side of the return flow passage 104. This switching valve 121, in a normal state, is in a state such that coating material flows between the upstream side and downstream side of the return flow passage 104. However, for example, when cleaning liquid has flowed from the coating material supply passage 103 via the painting head 53 or bypass flow passage 115 to the return flow passage 104, the operation of the switching valve 121 is switched and the cleaning liquid is evacuated via the evacuation passage 122.

It should be noted that the return flow passage 104 is connected to the above-described air bubble removal member 101 on the downstream side from the switching valve 121.

Furthermore, a control unit 130 is provided in the painting robot 10. The control unit 130 is a part which governs the actuation of the various driving parts of the coating material supply mechanism 100A. Furthermore, detection signals from various sensors of the coating material supply mechanism 100A are inputted into the control unit 130, and the actuation of the driving parts corresponding to those sensors is controlled accordingly. Specifically, as shown in FIG. 8, measurement results for pressure measured by pressure sensors S1 through S8 are transmitted to the control unit 130. Furthermore, the control unit 130 controls the actuation of the three-way valves 113, 117, the supply pump 105, the vacuum pump 110, the paint regulators 112, 119, the shutoff valve 116, the suction pump 120 and the switching valve 121. It should be noted that the control unit 130 may be used to govern the actuation of the driving parts of the robot arm R1, or else the actuation of the driving parts of the robot arm R1 may be governed by a separate control means.

It should be noted that the control unit 130 comprises a CPU, memory (ROM, RAM, nonvolatile memory, etc.) and other elements. Furthermore, the memory is used to store programs and data for performing the desired control. This control unit 130 corresponds to the valve control means and pump control means, and also corresponds to the determination means which performs determination as to whether there are air bubbles admixed into the coating material on the basis of the measurement results of the pressure sensors S1, S2 and the measurement results of the first flowmeter FM1 and second flowmeter FM2.

Furthermore, a notification means 140 is connected to the control unit 130. The notification means 140 is a means for notifying the fact that there admixed air bubbles to the user upon receiving a signal corresponding to the fact that there is admixture of air bubbles from the control unit 130 when it has been determined that there are air bubble admixed into the coating material; for example, a buzzer or a notification display would correspond to such a notification means.

(1-8. Second Configuration Example of Coating Material Supply Mechanism, Air Bubble Removal Member and Flowmeter)

In the following, a coating material supply mechanism 100B according to a second configuration example differing from the coating material supply mechanism 100A according to the first configuration example will be described. The majority of the configuration of the coating material supply mechanism 1008 according to the second configuration example is the same as the configuration of the coating material supply mechanism 100A according to the first configuration example described above, but a portion is different. Thus, in the following description of the configuration of the coating material supply mechanism 1008 according to the second configuration example, mainly the features that differ from the coating material supply mechanism 100A according to the first configuration example will be described.

Figure 11:
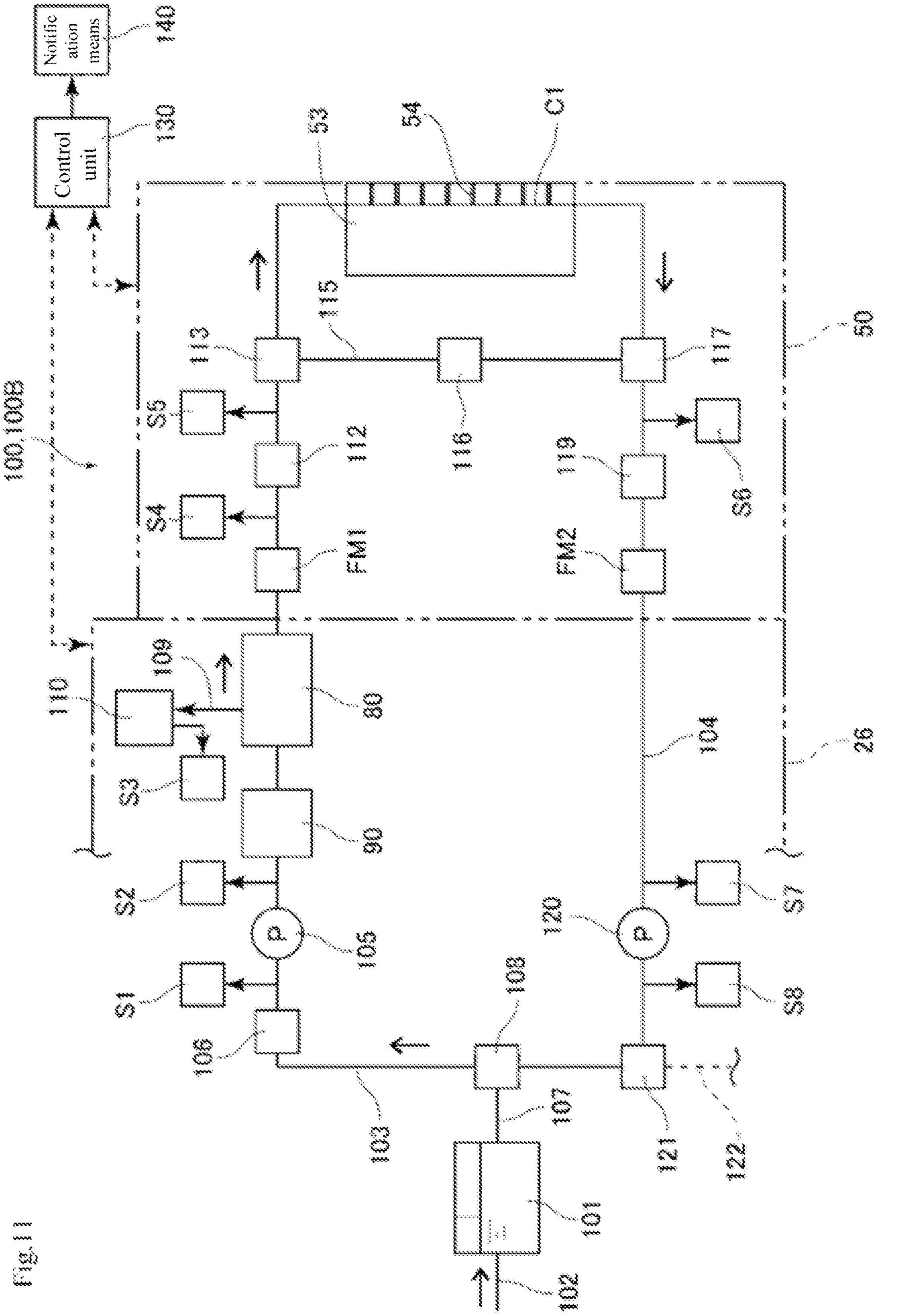
FIG. 11 is a drawing illustrating the schematic configuration of the coating material supply mechanism, etc. according to a second configuration example different from the coating material supply mechanism according to the first configuration example shown in FIG. 8.

FIG. 11 is a drawing illustrating the schematic configuration of the coating material supply mechanism 1008, etc. according to the second configuration example. The coating material supply mechanism 100B according to this second configuration example comprises an air bubble removal member 101, an external supply passage 102, a coating material supply passage 103, a return flow passage 104, a supply pump 105, pressure sensors S1 through S8, a first flowmeter FM1 and a second flowmeter FM2, and additionally comprises a second air bubble removal member 106, a connection passage 107, and a three-way valve 108. It should be noted that the air bubble removal member 101 may be referred to in the following as first air bubble removal member 101.

In the aforementioned configuration, the first air bubble removal member 101, similarly to the air bubble removal member 101 in the first configuration example described previously, is connected to the external supply passage 102, and coating material from an external coating material storage area enters into the tank main body 101*a* therethrough.

Here, the air bubble removal member 101 according to the second configuration example, unlike the air bubble removal member 101 in the first configuration example described previously, is not connected to the return flow passage 104 and is also not connected to the coating material supply passage 103. However, the first air bubble removal member 101 according to the second configuration example is configured such that the coating material from the tank main body 101*a* is supplied to the coating material supply passage 103 via a connection passage 107 and three-way valve 108. The connection passage 107 is a coating material flow passage connecting the first air bubble removal member 101 and the three-way valve 108. Thus, the coating material is supplied from the first air bubble removal member 101 via the connection passage 107 and the three-way valve 108 to the coating material supply passage 103, while coating material that was not ejected from the return flow passage 104 does not enter the tank main body 101*a* of the first air bubble removal member 101 but flows via the three-way valve 108 into the coating material supply passage 103.

Furthermore, the three-way valve 108 is a valve member connected to the coating material supply passage 103, return flow passage 104 and connection passage 107. This three-way valve 108, during painting when the coating material consumption rate is large, is able to switch operation so as to cause coating material to flow via the connection passage 107 from the first air bubble removal member 101 to the coating material supply passage 103 side. On the other hand, when coating material is not being ejected from the painting head 53, the operation of the valve can be switched so as to cause coating material which has returned to the return flow passage 104 without being ejected from the painting head 53 to flow into the coating material supply passage 103. It should be noted that the operation of the three-way valve 108 is controlled by the control unit 130.

Furthermore, the coating material supply mechanism 1008 according to the second configuration example comprises a second air bubble removal member 106. Specifically the second air bubble removal member 106 is disposed in the coating material supply passage 103 on the downstream side from the first air bubble removal member 101. The second air bubble removal member 106, similarly to the first air bubble removal member 101 described previously, is configured internally so as to remove air bubbles. It will be noted that the second air bubble removal member 106, similarly to the first air bubble removal member 101 described above, corresponds to the air bubble removal means. This second air bubble removal member 106, similarly to the first air bubble removal member 101 described above, may also be disposed at a stable location other than the robot arm R1, such as the base 21, the leg part 22, the installation surface on which the robot main body 20 is installed, etc.

Such a second air bubble removal member 106 may employ the same configuration as the first air bubble removal member 101 described previously or may employ a different configuration from the first air bubble removal member 101. For example, the second air bubble removal member 106 may employ the same configuration as the first air bubble removal member 101 as shown in FIG. 9 and FIG. 10, or may employ features of the configuration shown in FIG. 9 and FIG. 10 different from the first air bubble removal member 101, or may employ features other than those shown in FIG. 9 and FIG. 10.

It should be noted that in FIG. 9 and FIG. 10, the portion of the second air bubble removal member 106 corresponding to the tank main body 101*a* has been designated as tank main body 106*a*, the portion corresponding to coating material introduction pipe line 101*b* has been designated as coating material introduction pipe line 106*b*, the portion corresponding to the gas evacuation pipe line 101*c* has been designated as gas evacuation pipe line 106*c*, the portion corresponding to air evacuation valve 101*d* has been designated as air evacuation valve 106*d*, the portion corresponding to coating material evacuation pipe line 101*e* has been designated as coating material evacuation pipe line 106*c*, and the portion corresponding to partition filter 101*f* has been designated as partition filter 106*f*.

It will be noted that the second air bubble removal member 106, similarly to the first air bubble removal member 101 described above, may also employ a configuration in which no air evacuation valve 106*d* is provided. For example, the gas evacuation pipe line 106*c* may be connected to a suction pump, etc. so as to maintain the tank main body 106*a* at a slightly negative pressure, thereby promoting the evacuation of gases from inside the tank main body 106*a*.

It will be noted that in cases where a configuration is adopted in which a second air bubble removal member 106 is provided in addition to the first air bubble removal member 101, the second air bubble removal member 106 will also have the following function. Namely, coating material supplied from the first air bubble removal member 101 via the connection passage 107, described later, after passing through the three-way valve 108, described later, will not be able to return again to the connection passage 107 side. Thus, there is the concern that, if coating material were to be supplied through driving of the supply pump 105 at above the coating material ejection rate from the painting head 53, this could become a cause of problems such as stoppage of coating material circulation. Thus, by arranging the second air bubble removal member 106 in an intermediate portion of the coating material supply passage 103 so as to function also as a buffer that stores coating material, it is made possible to eject coating material from the painting head 53 in a state such that the circulation of coating material in the circulation passage going from the coating material supply passage 103 through the painting head 53 and via the return flow passage 104 would not be impeded even if the amount of coating material stored inside the second air bubble removal member 106 should fluctuate.

It should be noted that the rest of the configuration is the same as in the coating material supply mechanism 100A according to the first configuration example described previously.

2. Function

Next, the function the painting robot 10 having a configuration as described above will be described. It should be noted that the following description will be based on the coating material supply mechanism 100A according to the first configuration example.

(2-1. Flow (Supply) of Coating Material when Painting a Vehicle)

When painting is to be carried out on an unillustrated vehicle, the various parts of the robot arm R1 are actuated, and the painting head 53 is actuated as well. At this time, the control unit 130 controls the operation of the supply pump 105 on the basis of the measurement results of pressure sensors S1, S2. As a result, the coating material accumulated in the air bubble removal member 101 flows via the coating material supply passage 103 toward the removal filter 90.

Furthermore, coating material which has passed through the aforementioned removal filter 90 is supplied to the deaeration module 80. Here, the vacuum pump 110 is actuated under the control of the control unit 130 to reduce the pressure inside the hollow fiber membranes 83. Thus, when the coating material passes between the hollow fiber membranes 83 inside the case member 81, dissolved gases are removed (separated) from the coating material. The coating material which has undergone deaeration of dissolved gases is then supplied to the downstream side of the coating material supply passage 103 (the paint regulator 112 side). It will be noted that the control unit 130 controls the operation of the vacuum pump 110 on the basis of coating material pressure measurement results from pressure sensor S3.

Furthermore, in the paint regulator 112, the supply pressure and supply rate of coating material supplied to the painting head 53 are regulated to an appropriate level while moderating the pulsation of coating material supply due to the supply pump 105. It will be noted that the control unit 130 controls the operation of the paint regulator 112 on the basis of coating material pressure measurement results from pressure sensor S5.

Here, when coating material is to be supplied to the painting head 53, the control unit 130 switches the three-way valve 113 so as to supply coating material to the painting head 53, and the coating material being fed to the painting head 53 causes coating material to be ejected from the nozzles 54. It should be noted that when coating material is ejected from the nozzles 54, it is possible to detect if ejection of coating material from the nozzles 54 is being properly performed by measuring the pressure of the coating material flowing through the coating material supply passage 103 with pressure sensor S5.

It should be noted that in the state of ejecting coating material from the nozzles 54 as described above, the shutoff valve 116 is in a closed state, but the three-way valve 117 is able to make the coating material flow to the suction pump 120 side.

On the other hand, in cases where coating material is being supplied to the painting head 53 but is not being ejected from the nozzles 54, the coating material flows into the return flow passage 104 after passing through circulation passage C1 (see FIG. 8) inside the painting head 53, comprising the supply side large flow passage 57, row direction supply flow passages 58, row direction evacuation flow passages 60, and evacuation side large flow passage 61 located inside the painting head 53. At this time, the control unit 130 actuates the suction pump 120 and controls the operation of the paint regulator 119. Specifically, on the basis of the pressure measurement results from pressure sensors S7, S8, the control unit 130 controls the operation of the suction pump 120 such that an appropriate negative pressure is exerted on the return flow passage 104.

At this time, the control unit 130 controls the operation of the paint regulator 119. In the paint regulator 119, the negative pressure exerted on the painting head 53 is adjusted to an appropriate level while moderating the pulsation of coating material supply by the suction pump 120. At this time, the control unit 130 controls the operation of the paint regulator 119 on the basis of coating material pressure measurement results from pressure sensor S6.

It should be noted that the coating material flows from the return flow passage 104 into the air bubble removal member 101, and the coating material from this air bubble removal member 101 is again supplied to the coating material supply passage 103.

(2-2. Supply of Coating Material when Painting of a Vehicle is not being Carried Out)

Next, the function of the painting robot 10 will be described for the case where coating material is not being supplied to the painting head 53 side and painting of a vehicle is not being carried out. In the case of a standby state in which painting of a vehicle is not being carried out, if a state occurs in which the coating material inside the coating material supply passage 103 does not flow, certain components inside the coating material may precipitate, the viscosity may increase, etc. Thus, in standby state, it is necessary to keep the coating material inside the coating material supply passage 103 flowing. Therefore, the control unit 130, just as during painting, actuates the supply pump 105 and the paint regulator 112, and also actuates the vacuum pump 110, to supply coating material to the three-way valve 113 side while performing deaeration of the coating material.

However, despite the fact that no coating material is being ejected from the nozzles 54, if coating material passes through the circulation passage C1 on the painting head 53 side as shown in FIG. 8 and is suctioned by the suction pump 120, there is the concern that air may be drawn in through the nozzles 54.

Thus, in the present embodiment, in the case of the standby state described above, the control unit 130 switches the three-way valve 113 such the coating material flows to the bypass flow passage 115, creating a state in which coating material is not supplied to the painting head 53. At the same time, the control unit 130 places the shutoff valve 116 into an open state. Furthermore, the control unit 130 switches the three-way valve 117 such that coating material flows from the bypass flow passage 115 to the suction pump 120 of the return flow passage 104.

In addition to the state described above, the control unit 130, similarly to the case during painting described above, actuates the suction pump 120 and controls the operation of the paint regulator 119. Thus, the coating material passes from the bypass flow passage 115 through the three-way valve 117, flows through the return flow passage 104, and is again accumulated in the air bubble removal member 101. Furthermore, by actuating the supply pump 105 and the paint regulator 112 described above, the control unit 130 causes the coating material to flow again through the coating material supply passage 103 toward the three-way valve 113.

Consequently, the coating material enters a state of circulating through the coating material supply passage 103, bypass flow passage 115 and return flow passage 104, and passes through the removal filter 90 and deaeration module 80 during each such circulation. Thus, foreign matter is removed from the coating material to a greater extent, and deaeration of the coating material is further promoted.

(2-3. Determination of Whether or not Air Bubbles are Admixed into the Coating Material)

Next, with regard to the control unit 130, the case will be described where the control unit 130 determines whether or not air bubbles are admixed into the coating material on the basis of the measurement results of pressure sensors S1, S2 and the measurement results of the first flowmeter FM1 and second flowmeter FM2.

First, the case of determining that air bubbles are admixed using the pressure measurement results from pressure sensor S2 will be described. In the case where the control unit 130 has controlled and driven the supply pump 105 at a predetermined rotational speed, in the normal state where hardly any air bubbles are admixed, the measured value for pressure at the pressure sensor S2 will exceed a pressure threshold value corresponding to the predetermined rotational speed. However, assuming that air bubbles have become admixed at any location within the coating material supply passage 103, the pressure will not rise to where it exceeds the pressure threshold value at the pressure sensor S2. Therefore, when such pressure does not exceed and is below the pressure threshold value at the pressure sensor S2, the control unit 130 determines that there are admixed air bubbles.

It should be noted that instead of determining that air bubbles have become admixed using the pressure measurement results from the pressure sensor S2, it may also be determined that air bubbles have been admixed using the pressure measurement results of both pressure sensor S1 and pressure sensor S2.

Next, the case of determining admixture of air bubbles using the first flowmeter FM1 will be described. In this case, if the air bubbles are present in the coating material flowing through the coating material supply passage 103, the measured value of flow rate will show an abnormality (error). For example, if the first flowmeter FM1 is of the ultrasonic type, ultrasonic signals are transmitted and received from two ultrasonic sensors arranged so as to intersect the coating material supply passage 103, and the difference in propagation time at the two ultrasonic sensors is measured, and if air bubbles are present, the propagation time becomes an abnormal value different from the normal value. Furthermore, if the first flowmeter FM1 is of the optical type, the flow velocity of coating material is measured using the Doppler effect when, for example, laser light is projected and reflected light is received, and in this case, if air bubbles are present, the flow velocity measurement result will be an abnormal value. When such information relating to an abnormality from the first flowmeter FM1 is received by the control unit 130, the control unit 130 determines that air bubbles are admixed.

The case of determining that air bubbles are admixed using the pressure measurement results from pressure sensor S7 is similar to the measurement using pressure sensor S2 described above. In this case as well, in the case where the control unit 130 has controlled and driven the suction pump 120 at a predetermined rotational speed, in the normal state where hardly any air bubbles are admixed, the measured value for pressure at the pressure sensor S7 will be below a pressure threshold value corresponding to the predetermined rotational speed. However, assuming that air bubbles have become admixed at any location within the return flow passage 104, the pressure will end up rising beyond the pressure threshold value at the pressure sensor S7. Therefore, when such pressure exceeds the pressure threshold value at the pressure sensor S7, the control unit 130 determines that there are admixed air bubbles.

It should be noted that instead of determining that air bubbles have become admixed using the pressure measurement results from the pressure sensor S7, it may also be determined that air bubbles have been admixed using the pressure measurement results of both pressure sensor S7 and pressure sensor S8.

Next, the case of determining admixture of air bubbles using the second flowmeter FM2 will be described. In this case as well, similarly to the first flowmeter FM1 described above, when air bubbles are present in the coating material flowing through the return flow passage 104, the flow rate measurement result shows an abnormality (error). It should be noted that the point at which the measured value of flow rate becomes abnormal (an error) is the same as for the first flowmeter FM1 discussed above, so description of the details thereof will be omitted. When such information relating to an abnormality from the second flowmeter FM2 is received by the control unit 130, the control unit 130 determines that air bubbles are admixed.

It should be noted that in case where it has been determined that air bubbles are admixed in the coating material as described above, there is a high likelihood that it will not be possible to carry out painting of the vehicle normally, so painting of the vehicle may be interrupted. During such painting interruption, in order to remove air bubbles from the coating material, the control unit 130 may execute deaeration treatment mode. In this deaeration treatment mode, the control unit 130 switches the three-way valve 113 such that coating material flows to the bypass flow passage 115, creating a state where coating material is not supplied to the painting head 53. At the same time, the control unit 130 places the shutoff valve 116 into an open state. Furthermore, the control unit 130 switches the three-way valve 117 such that coating material flows from the bypass flow passage 115 to the suction pump 120 of the return flow passage 104.

In such a state, the supply pump 105 and suction pump 120 are operated such that more coating material flows than in the state where normal painting is performed (such that the coating material flows at higher velocity). As a result, air bubbles are moved from the coating material in the air bubble removal member 101, and gases due to the rupture, etc. of these air bubbles are evacuated through the gas evacuation pipe line 101*c*. The deaeration treatment mode for removing air bubbles from the coating material is executed In cases where the control unit 130 has determined that air bubbles are admixed in the coating material, as described above.

3. Effect

As described above, the painting robot 10, equipped with a robot arm R1, which performs painting on an object of painting through actuation of the robot arm R1, comprises: a painting head 53 which is mounted on the tip end side of the robot arm R1 and which comprises multiple nozzles 54 that eject coating material and causes the coating material to be ejected from the nozzles 54 through driving of a piezoelectric substrate 62; a coating material supply passage 103 which is connected to the coating material supply side of the painting head 53; a return flow passage 104 which is connected to the coating material evacuation side of the painting head 53 and which recovers the coating material that was not ejected from the nozzles 54; a bypass flow passage 115 which is provided in the robot arm R1 and which allows the coating material to flow through in parallel to the painting head; a shutoff valve 116 which is provided in the bypass flow passage 115 and which switches on or off the flow of the coating material flowing through the bypass flow passage 115; a control unit 130 (valve control means) which controls the opening and closing of the shutoff valve 116; and a first air bubble removal member 101 (air bubble removal member 101) and/or second air bubble removal member 106 (air bubble removal means) which is provided in a stable part of the robot arm whereof the orientation does not change and which is provided so as to enable supply of the coating material to an intermediate portion of the return flow passage 104 or the coating material supply passage 103 and removes air bubbles contained in the coating material.

Employing such a configuration makes it possible to remove air bubbles contained in the coating material with the first air bubble removal member 101 (air bubble removal member 101) and/or the second air bubble removal member 106 (air bubble removal means) when coating material flows through the coating material supply mechanism 100. Furthermore, in a painting rest state where no painting is being performed, coating material circulates through the coating material supply passage 103, bypass flow passage 115 and return flow passage 104. Thus, by circulating the coating material during the painting rest state, it becomes possible to effectively remove air bubbles in the coating material using the first air bubble removal member 101 (air bubble removal member 101) and/or the second air bubble removal member 106 (air bubble removal means).

Furthermore, in cases where the painting head 53 is attached to the tip end side of the robot arm R1, there is the concern that air bubbles may arise inside the painting head 53 due to change of orientation of the painting head 53, and in such cases as well, it becomes possible to effectively remove air bubbles with the first air bubble removal member 101 (air bubble removal member 101) and/or the second air bubble removal member 106 (air bubble removal means) provided at a stable location outside the robot arm R1.

Furthermore, in the present embodiment, the first air bubble removal member 101 (air bubble removal member 101) and/or the second air bubble removal member 106 (air bubble removal means) comprises a tank main body 101*a*, 106*a* that store coating material, and in the upper part of the tank main body 101*a*, 106*a* above the coating material storage area, there is provided an end (evacuation port), inside the tank main body 101*a*, 106*a*, of a gas evacuation pipe line 101*c*, 106*c* for evacuating gases from inside he tank main body 101*a*, 106*a*, while in the lower part of the coating material storage area of the tank main body 101*a*, 106*a*, there is provided an end (outflow port), inside the tank main body 101*a*, 106*a*, of a coating material evacuation pipe line 101*e*, 106*e* that allows coating material to flow through to the downstream side.

When such a configuration is employed, inside the tank main body 101*a*, 106*a*, air bubbles are present above the liquid surface, but as coating material flows in, air bubbles gather above the coating material storage area, and due to the disappearance, etc. of air bubbles with the passage of time, gases are evacuated through the end (evacuation port) of the gas evacuation pipe line 101*c*, 106*c* inside the tank main body 101*a*, 106*a*. In this way, causing coating material to flow into the tank main body 101*a*, 106*a* makes it possible to remove air bubbles from the coating material. Furthermore, the presence of an end (outflow port) of the coating material evacuation pipe line 101e, 106e inside the tank main body 101a, 106a at the lower part of the coating material storage area makes it possible to prevent air bubbles from entering the downstream side going toward the painting head 53.

Furthermore, in the present embodiment, a configuration can be adopted in which an openable and closeable air evacuation valve 101d, 106d is provided at the end (evacuation port) of the gas evacuation pipe line 101c, 106c inside the tank main body 101a, 106a. Moreover, the air evacuation valve 101d, 106d can be made into a control valve that is opened under the control of the control unit 130 (valve control means) after a fixed period of time has elapsed or when the gas pressure inside the tank main body 101a, 106a has reached a fixed magnitude.

When such a configuration is employed, by controlling the operation of the air evacuation valve 101d, 106d with the control unit 130 (valve control means) such that the air evacuation valve 101d, 101d opens only when the gas pressure of the tank main body 101a, 106a has risen, it becomes possible, for example, to leave the air evacuation valve 101d, 106d closed when the air bubble generation rate is low, making it possible to prevent exposure of coating material to the external atmosphere and evaporation of components such as solvent from the coating material. Furthermore, the air evacuation valve 101d, 106d is controlled and driven by the control unit 130 (valve control means) such that the valve is opened after a fixed period of time has elapsed or when the pressure inside the tank main body 101a, 106a has reached a fixed magnitude, making it possible to prevent the pressure inside the tank main body 101a, 106a from becoming too high.

Furthermore, in the present embodiment, on the end (evacuation port) of the gas evacuation pipe line 101c, 106c inside the tank main body 101a, 106a, there can be provided a relief valve that opens automatically when the internal pressure inside the tank main body 101a, 106a due to inflow of air bubbles rises to a predetermined pressure.

When employing such a configuration, since the air evacuation valve 101d, 106d is a relief valve, the air evacuation valve 101d, 106d will open automatically, allowing gases to be evacuated to the outside, when the gases inside the tank main body 101a, 106a have reached a certain pressure. It thus becomes possible to keep the pressure inside the tank main body 101a, 106a constant.

Furthermore, in the present embodiment, coating material is supplied via the coating material introduction pipe line 101b, 106b into the tank main body 101a, 106a, and the coating material inside the tank main body 101a, 106a is evacuated from inside the tank main body 101a, 106a via the coating material evacuation pipe line 101e, 106e. Furthermore, a configuration can be employed wherein a partition filter 101f, 106f that removes air bubbles when coating material passes therethrough is installed inside the tank main body 101a, 106a, and in the case of such a configuration, the partition filter 101f, 106f demarcates the inside of the tank main body 101a, 106a into a coating material introduction pipe line 101b, 106b side and a coating material evacuation pipe line 101e, 106e side, such that coating material from the coating material introduction pipe line 101b, 106b side inside the tank main body 101a, 106a flows to the coating material evacuation pipe line 101e, 106e side after passing through the partition filter 101f, 106f.

Employing such a configuration allows the coating material supplied inside the tank main body 101a, 106a via the coating material introduction pipe line 101b, 106b to reliably pass through the partition filter 101f, 106f. Thus, the presence of the partition filter 101f, 106f makes it possible to remove air bubbles inside the coating material.

Furthermore, in the present embodiment, a configuration can be employed wherein a stirrer 200 is mounted in the tank main body 101a, 106a. In the case of such a configuration, the stirrer 200 comprises a stirring element 201 and a stirring element driving device 202; the stirring element driving device 202 comprises a drive magnet 202c that generates magnetic attraction force between itself and the stirring element 201 and a motor 202b that rotates the drive magnet 202c; the stirring element 201 is arranged inside the tank main body 101a, 106a; and the drive magnet 202c is arranged in a state opposite the stirring element 201 on the outside the tank main body 101a, 106a. Furthermore, rotating the drive magnet 202c through driving of the motor 202b causes the stirring element 201 to rotate, and in conjunction with the rotation of the stirring element 201, the coating material inside the tank main body 101a, 106a is made to rotate.

By employing such a configuration, in the state where the magnetized portions of the drive magnet 202c and the stirring element 201 are attracted to each other by magnetic force, when the motor 202b is driven, the drive magnet 202c and the stirring element 201 inside the tank main body 101a will rotate as well. As a result, the coating material inside the tank main body 101a is rotated, at which time the coating material, which has a high density, moves outward due to the action of centrifugal force, and air bubbles, which have a low density, gather toward the center of the rotating coating material. Thus, it becomes possible to remove air bubbles from the coating material by evacuating the outer portion of the coating material rotating in the tank main body 101a through the coating material evacuation pipe line 101e to the coating material supply passage 103 side.

Furthermore, rotating the coating material inside the tank main body 101a causes the shear velocity in the coating material to rise, thus making it possible to reduce the viscosity of the coating material. Furthermore, this makes it possible to prevent precipitation of pigment contained in the coating material.

Furthermore, in the present embodiment, the following can be done. Namely, a supply pump 105, which is a gear pump, and a suction pump 120, for evacuating coating material to the downstream side, may be provided at any location in the coating material circulation passage formed by the coating material supply passage 103, return flow passage 104 and bypass flow passage 115. Furthermore, the rotational speed of the supply pump 105 and suction pump 120 (gear pump) is controlled by the control unit 130 (pump control means). Furthermore, pressure sensors S1, S2, S7, S8 for measuring the pressure of the coating material flowing through the coating material circulation passage are provided on at least one of the upstream side or the downstream side of the coating material circulation passage from the supply pump 105 and the suction pump 120 (gear pump), and when air bubbles have entered into the coating material, the determination of admixture of air bubbles is made on the basis of the controlled rotational speed at which the supply pump 105 and suction pump 120 (gear pump) are driven according to control by the control unit 130 (pump control means) and the measured pressure as measured by the pressure sensors S1, S2, S7, S8. Furthermore, in the case where the measured pressure exceeds a predetermined upper limit value or is below a predetermined lower limit value relative to a set pressure value corresponding to the aforementioned controlled rotational speed, the control unit 130 (determination means) determines that there is air admixture, and when the determination of air admixture has been made by the control unit 130 (pump control means), notification of the fact of air admixture is given by the notification means 140.

When employing such a configuration, the control unit 130 (determination means) determines that there is air admixture if the measured pressure at the pressure sensors S1, S2, S7, S8 exceeds a predetermined upper limit value or is below a predetermined lower limit value relative to a set pressure value corresponding to the controlled rotational speed of the supply pump 105 and suction pump 120 (gear pump). Thus, it becomes possible to effectively detect if defects of ejection of coating material from the painting head 53 are occurring. Furthermore, in the case where air admixture is present, notification is provided by the notification means 140, making it easier to decide whether painting is to be continued subsequently, or if an operation to evacuate air bubbles from painting head 53 is to be performed, or if the painting head is to be replaced, etc.

Furthermore, in the present embodiment, the following can be done. Namely, a supply pump 105, which is a gear pump, and a suction pump 120, for evacuating coating material to the downstream side, may be provided at any location in the coating material circulation passage formed by the coating material supply passage 103, return flow passage 104 and bypass flow passage 115. Furthermore, the rotational speed of the supply pump 105 and suction pump 120 (gear pump) is controlled by the control unit 130 (pump control means). Furthermore, on at least one of the upstream side or the downstream side of the coating material circulation passage from the supply pump 105 and suction pump 120 (gear pump), there are provided a first flowmeter FM1 and second flowmeter FM2 (flowmeter) for measuring the flow rate of coating material flowing through the coating material circulation passage, and when air bubbles have entered the coating material, the determination of admixture of air bubbles is made on the basis of the controlled rotational speed at which the supply pump 105 and suction pump 120 (gear pump) are driven according to control by the control unit 130 (pump control means) and the measured flow rate as measured by the first flowmeter FM1 and second flowmeter FM2 (flowmeter). Furthermore, in the case where the measured flow rate exceeds a predetermined upper limit value or is below a predetermined lower limit value relative to a set flow rate value corresponding to the aforementioned controlled rotational speed, the control unit 130 (determination means) determines that there is air admixture, and when the determination of air admixture has been made by the control unit 130 (pump control means), notification of the fact of air admixture is given by the notification means 140.

When employing such a configuration, the control unit 130 (determination means) determines that there is air admixture if the measured flow rate at the first flowmeter FM1 and second flowmeter FM2 exceeds a predetermined upper limit value or is below a predetermined lower limit value relative to a set pressure value corresponding to the controlled rotational speed of the supply pump 105 and suction pump 120 (gear pump). Thus, it becomes possible to effectively detect if defects of ejection of coating material from the painting head 53 are occurring. Furthermore, in the case where air admixture is present, notification is provided by the notification means 140, making it easier to decide whether painting is to be continued subsequently, or if an operation to evacuate air bubbles from the painting head 53 is to be performed, or if the painting head is to be replaced, etc.

Furthermore, in the present embodiment, in cases where it has been determined by the control unit 130 (determination means) that there is air admixture, the control unit 130 (valve control means) can open the shutoff valve 116 such that coating material will flow through the bypass flow passage 115, and the control unit 130 (pump control means) can control the operation of the supply pump 105 and the suction pump 120 (gear pump) such that more coating material flows than in the state of performing painting on an object of painting.

As a result, when it has been determined that there is air admixture, more coating material will flow through the bypass flow passage 115 than normally, and thus more coating material will flow into the first air bubble removal member 101 (air bubble removal member 101) and/or second air bubble removal member 106. Thus, it becomes possible to remove more air bubbles from the coating material with the second air bubble removal member 106.

4. Modified Examples

An embodiment of the present invention was described above, but the present invention can be variously modified beyond the above embodiment. Modified examples will be described below.

In the embodiment described above, a configuration was employed in which pressure sensors S1 through S8 and a first flowmeter FM1 and second flowmeter FM2 were provided. However, when the first flowmeter FM1 and second flowmeter FM2 are provided, at least one of the pressure sensors S1 through S8 may be omitted, and when the pressure sensors S1 through S8 are provided, at least one of the first flowmeter FM1 or second flowmeter FM2 may be omitted.

Furthermore, in the embodiment described above, the deaeration module 80 corresponding to the second filter was illustrated in FIG. 7 as being of the external flow type. However, the deaeration module may also have a configuration using an internal flow arrangement.

Furthermore, in the embodiment described above, a paint regulator 119 and pressure sensor S6 were provided in the return flow passage 104 of the coating material supply mechanism 100. However, a configuration in which paint regulator 119 and pressure sensor S6, etc. are omitted may also be employed.

Furthermore, in the embodiment described above, a configuration was employed in which the deaeration module 80 is mounted at an intermediate portion of the robot arm R1. However, the deaeration module 80 may also be mounted at a location other than the robot arm R1. For example, the deaeration module 80 may be mounted on the base 21 side or the leg part 22 side, or the deaeration module 80 may be arranged on the installation surface on which the painting robot 10 is installed.

Furthermore, in the embodiment described above, a configuration may be employed in which the air bubble removal member 101 (first air bubble removal member 101) and the second air bubble removal member 106 are provided in an intermediate portion of the coating material supply passage 103, or a configuration may be employed in which these are provided in an intermediate portion of the return flow passage 104.

DESCRIPTION OF REFERENCE SYMBOLS

10 . . . painting robot; 20 . . . robot main body; 21 . . . base; 22 . . . leg part; 23 . . . rotary shaft part; 24 . . . rotary arm; 25 . . . first turning arm; 26 . . . second turning arm; 27 . . . wrist part; 50 . . . painting head unit; 52 . . . nozzle forming surface; 53 . . . painting head; 54 . . . nozzle; 55 . . . nozzle row; 55A . . . first nozzle row; 55B . . . second nozzle row; 57 . . . supply side large flow passage; 58 . . . row direction supply flow passage; 59 . . . nozzle pressurization chamber; 59*a* . . . nozzle supply flow passage; 59*b* . . . nozzle evacuation flow passage; 60 . . . row direction evacuation flow passage; 61 . . . evacuation side large flow passage; 62 . . . piezoelectric substrate; 63*a* . . . piezoelectric ceramic layer; 63*b* . . . piezoelectric ceramic layer; 64 . . . common electrode; 65 . . . individual electrode; 80 . . . deaeration module; 81 . . . case member; 81*a* . . . coating material supply port; 81*b* . . . suction port; 81*c* . . . coating material evacuation port; 82 . . . hollow fiber membrane bundle; 82*a* . . . central supply part; 83 . . . hollow fiber membrane; 84 . . . inflow side sealing member; 84 *a* . . . supply orifice; 85 . . . evacuation side sealing member; 90 . . . removal filter; 100, 100A, 100B . . . coating material supply mechanism; 101 . . . air bubble removal member; first air bubble removal member (equivalent to air bubble removal means); 101*a*, 106*a* . . . tank main body; 101*b*, 106*b* . . . coating material introduction pipe line; 101*c*, 106*c* . . . gas evacuation pipe line; 101*d*, 106*d* . . . air evacuation valve; 101*e*, 106*e* . . . coating material evacuation pipe line; 101*f*, 106*f* . . . partition filter; 102 . . . external supply passage; 103 . . . coating material supply passage; 104 . . . return flow passage; 105 . . . supply pump (equivalent to gear pump); 106 . . . second air bubble removal member (equivalent to air bubble removal means); 107 . . . connection passage; 108 . . . three-way valve; 109 . . . suction pipe line; 110 . . . vacuum pump; 112 . . . paint regulator; 113 . . . three-way valve; 115 . . . bypass flow passage; 116 . . . shutoff valve; 117 . . . three-way valve; 119 . . . paint regulator; 120 . . . suction pump (equivalent to gear pump); 121 . . . switching valve; 122 . . . evacuation passage; 130 . . . control unit (equivalent to valve control means, pump control means and determination means); 140 . . . notification means; 200 . . . stirrer; 201 . . . stirring element; 202 . . . stirring element driving device; 202*a* . . . case member; 202*b* . . . motor; 202*c* . . . drive magnet; 261 . . . module mounting part; C1 . . . circulation passage; FM1 . . . first flowmeter; FM2 . . . second flowmeter; R1 . . . robot arm; S1-S8 . . . pressure sensor

What is claimed is:

1. A painting robot comprising:

a robot arm, wherein the robot arm is configured for actuation for performing painting on an object to be painted;

a painting head mounted on a tip end side of the robot arm, wherein the painting head comprises multiple nozzles configured for ejecting coating material and causes the coating material to be ejected from the nozzles through driving of a piezoelectric substrate;

a coating material supply passage, wherein the coating material supply passage is connected to a coating material supply side of the painting head;

a return flow passage, wherein the return flow passage is connected to a coating material evacuation side of the painting head and recovers the coating material that was not ejected from the nozzles;

a bypass flow passage, wherein the bypass flow passage is provided in the robot arm and which allows the coating material to flow through in parallel to the painting head;

a shutoff valve, wherein the shutoff valve is provided in the bypass flow passage and which switches on or off the flow of the coating material flowing through the bypass flow passage;

a control unit, wherein the control unit controls an opening and closing of the shutoff valve; and an air bubble removal member comprising a tank main body for storage of the coating material, wherein the air bubble removal member is provided in a stable part of the robot arm at a location where an orientation of the stable part of the robot arm does not change, and which is provided so as to enable supply of the coating material to the coating material supply passage or the return flow passage and removes air bubbles contained in the coating material, wherein the coating material is supplied inside the tank main body via a coating material introduction pipe line, wherein the coating material is evacuated from inside the tank main body via a coating material evacuation pipe line;

wherein the painting robot further comprises:

a partition filter installed inside the tank main body that removes the air bubbles when the coating material passes therethrough; and wherein the partition filter demarcates the tank main body into a coating material introduction pipe line side and a coating material evacuation pipe line side, such that the coating material on the coating material introduction pipe line side inside the tank main body will flow to the coating material evacuation pipe line side by passing through the partition filter.

2. The painting robot according to claim 1, wherein the air bubble removal member comprises:

an evacuation port for evacuating gas from within the tank main body is provided in the tank main body above an area of the tank main body which stores the coating material; and an outflow port of the coating material evacuation pipe line, which enables the coating material to flow to a downstream side is provided in a lower portion of the area of the tank main body which stores the coating material.

3. The painting robot according to claim 2, wherein the evacuation port is provided with an openable and closeable air evacuation valve; and wherein the air evacuation valve is a control valve which is opened under the control of the valve control means when a fixed period of time has elapsed or when a pressure of the gas inside the tank main body has reached a fixed magnitude.

4. The painting robot according to claim 2, wherein the evacuation port is provided with an openable and closeable air evacuation valve; and wherein the air evacuation valve is a relief valve which opens automatically when an internal pressure due to inflow of the air bubbles into the tank main body rises to a predetermined pressure.

5. The painting robot according to claim 2, further comprising:

a stirrer mounted to the tank main body, wherein the stirrer comprises a stirring element and a stirring element driving device;

wherein the stirring element driving device comprises a drive magnet which generates magnetic attraction force between the stirring element driving device and the stirring element, and a motor which causes the drive magnet to rotate;

wherein the stirring element is arranged inside the tank main body;

wherein the drive magnet is arranged outside the tank main body in a state opposite the stirring element; and wherein rotating the drive magnet through driving of the motor causes the stirring element to rotate, causing the coating material inside the tank main body to rotate in conjunction with rotation of the stirring element.

6. The painting robot according to claim 1, further comprising:

a gear pump which evacuates the coating material to a downstream side is provided at any location within a coating material circulation passage constituted by the coating material supply passage, the return flow passage and the bypass flow passage;

wherein the control unit is configured to control a rotational speed of the gear pump;

wherein on at least one of an upstream side or the downstream side of the coating material circulation passage from the gear pump, there is provided a pressure sensor for measuring pressure of the coating material flowing through the coating material circulation passage;

wherein the control unit is configured to determine that there is admixture of air bubbles in cases where air bubbles have entered the coating material based on a controlled rotational speed at which the gear pump is driven in accordance with control by the control unit and a measured pressure that has been measured by the pressure sensor, and which determines that there is air admixture in cases where the measured pressure is above a predetermined upper limit value or is below a predetermined lower limit value relative to a set pressure value corresponding to the controlled rotational speed; and wherein the control unit is configured to notify that there is air admixture when it has been determined by the control unit that there is air admixture.

7. The painting robot according to claim 1, further comprising:

a gear pump which evacuates the coating material to a downstream side is provided at any location within a coating material circulation passage constituted by the coating material supply passage, the return flow passage and the bypass flow passage;

wherein the control unit is configured to control a rotational speed of the gear pump;

on at least one of an upstream side or the downstream side of the coating material circulation passage from the gear pump, there is provided a flowmeter for measuring flow rate of the coating material flowing through the coating material circulation passage;

wherein wherein the control unit is configured to determine that there is admixture of air bubbles in cases where air bubbles have entered the coating material based on a controlled rotational speed at which the gear pump is driven in accordance with control by the control unit and a measured flow rate of the coating material that has been measured by the flowmeter, and which determines that there is air admixture in cases where the measured flow rate is above a predetermined upper limit value or is below a predetermined lower limit value relative to a set flow rate value corresponding to the controlled rotational speed; and wherein the control unit is configured to notify that there is air admixture when it has been determined by the control unit that there is air admixture.

8. The painting robot according to claim 6, wherein in cases where it has been determined by the control unit that there is air admixture, the control unit causes the shutoff valve to open such that the coating material flows through the bypass flow passage; and wherein the control unit controls the actuation of the gear pump such that more flow takes place than in a state of performing painting on an object of painting.

9. The painting robot according to claim 7, wherein in cases where it has been determined by the control unit that there is air admixture, the control unit causes the shutoff valve to open such that the coating material flows through the bypass flow passage; and wherein the control unit controls the actuation of the gear pump such that more flow takes place than in a state of performing painting on an object of painting.

10. The painting robot according to claim 3, further comprising:

a stirrer is mounted to the tank main body, wherein the stirrer comprises a stirring element and a stirring element driving device;

wherein the stirring element driving device comprises a drive magnet which generates magnetic attraction force between the stirring element driving device and the stirring element, and a motor which causes the drive magnet to rotate;

wherein the stirring element is arranged inside the tank main body;

wherein the drive magnet is arranged outside the tank main body in a state opposite the stirring element; and wherein rotating the drive magnet through driving of the motor causes the stirring element to rotate, causing the coating material inside the tank main body to rotate in conjunction with rotation of the stirring element.

11. The painting robot according to claim 4, further comprising:

a stirrer is mounted to the tank main body, wherein the stirrer comprises a stirring element and a stirring element driving device;

wherein the stirring element driving device comprises a drive magnet which generates magnetic attraction force between the stirring element driving device and the stirring element, and a motor which causes the drive magnet to rotate;

wherein the stirring element is arranged inside the tank main body;

wherein the drive magnet is arranged outside the tank main body in a state opposite the stirring element; and wherein rotating the drive magnet through driving of the motor causes the stirring element to rotate, causing the coating material inside the tank main body to rotate in conjunction with rotation of the stirring element.

12. The painting robot according to claim 2, further comprising:

a gear pump which evacuates the coating material to the downstream side is provided at any location within a coating material circulation passage constituted by the coating material supply passage, the return flow passage and the bypass flow passage;

wherein the control unit controls a rotational speed of the gear pump;

on at least one of an upstream side or the downstream side of the coating material circulation passage from the gear pump, there is provided a pressure sensor for measuring pressure of the coating material flowing through the coating material circulation passage;

wherein the control unit determines that there is admixture of air bubbles in cases where air bubbles have entered the coating material based on a controlled rotational speed at which the gear pump is driven in accordance with control by the control unit and a measured pressure that has been measured by the pressure sensor, and which determines that there is air admixture in cases where the measured pressure is above a predetermined upper limit value or is below a predetermined lower limit value relative to a set pressure value corresponding to the controlled rotational speed; and wherein the control unit notifies that there is air admixture when it has been determined by the control unit that there is air admixture.

13. The painting robot according to claim 3, further comprising:

a gear pump which evacuates the coating material to the downstream side is provided at any location within a coating material circulation passage constituted by the coating material supply passage, the return flow passage and the bypass flow passage;

wherein the control unit is provided for controlling rotational speed of the gear pump;

wherein on at least one of an upstream side or the downstream side of the coating material circulation passage from the gear pump, there is provided a pressure sensor for measuring pressure of the coating material flowing through the coating material circulation passage;

wherein the control unit is provided to determine that there is admixture of air bubbles in cases where air bubbles have entered the coating material based on a controlled rotational speed at which the gear pump is driven in accordance with control by the control unit and a measured pressure that has been measured by the pressure sensor, and which determines that there is air admixture in cases where the measured pressure is above a predetermined upper limit value or is below a predetermined lower limit value relative to a set pressure value corresponding to the controlled rotational speed; and wherein the control unit is provided for notifying that there is air admixture when it has been determined by the control unit that there is air admixture.

14. The painting robot according to claim 4, further comprising:

a gear pump which evacuates the coating material to the downstream side is provided at any location within a coating material circulation passage constituted by the coating material supply passage, the return flow passage and the bypass flow passage;

wherein the control unit is provided for controlling rotational speed of the gear pump;

wherein on at least one of an upstream side or the downstream side of the coating material circulation passage from the gear pump, there is provided a pressure sensor for measuring pressure of the coating material flowing through the coating material circulation passage;

wherein the control unit is provided to determine that there is admixture of air bubbles in cases where air bubbles have entered the coating material based on a controlled rotational speed at which the gear pump is driven in accordance with control by the control unit and a measured pressure that has been measured by the pressure sensor, and which determines that there is air admixture in cases where the measured pressure is above a predetermined upper limit value or is below a predetermined lower limit value relative to a set pressure value corresponding to the controlled rotational speed; and wherein the control unit is provided for notifying that there is air admixture when it has been determined by the control unit that there is air admixture.

15. The painting robot according to claim 5, further comprising:

a gear pump which evacuates the coating material to the downstream side is provided at any location within a coating material circulation passage constituted by the coating material supply passage, the return flow passage and the bypass flow passage;

wherein the control unit is provided for controlling rotational speed of the gear pump;

wherein on at least one of an upstream side or the downstream side of the coating material circulation passage from the gear pump, there is provided a pressure sensor for measuring pressure of the coating material flowing through the coating material circulation passage;

wherein the control unit is provided to determine that there is admixture of air bubbles in cases where air bubbles have entered the coating material based on a controlled rotational speed at which the gear pump is driven in accordance with control by the control unit and a measured pressure that has been measured by the pressure sensor, and which determines that there is air admixture in cases where the measured pressure is above a predetermined upper limit value or is below a predetermined lower limit value relative to a set pressure value corresponding to the controlled rotational speed; and wherein the control unit is provided for notifying that there is air admixture when it has been determined by the control unit that there is air admixture.

16. The painting robot according to claim 2, further comprising:

a gear pump which evacuates the coating material to the downstream side is provided at any location within a coating material circulation passage constituted by the coating material supply passage, the return flow passage and the bypass flow passage;

wherein the control unit is provided for controlling rotational speed of the gear pump;

wherein on at least one of an upstream side or the downstream side of the coating material circulation passage from the gear pump, there is provided a flowmeter for measuring flow rate of the coating material flowing through the coating material circulation passage;

wherein the control unit is provided to determine that there is admixture of air bubbles in cases where air bubbles have entered the coating material based on a controlled rotational speed at which the gear pump is driven in accordance with control by the control unit and a measured flow rate of the coating material that has been measured by the flowmeter, and which determines that there is air admixture in cases where the measured flow rate is above a predetermined upper limit value or is below a predetermined lower limit value relative to a set flow rate value corresponding to the controlled rotational speed; and wherein the control unit is provided for notifying that there is air admixture when it has been determined by the control unit that there is air admixture.

* * * * *